United States Patent
Sung

(10) Patent No.: US 10,404,373 B2
(45) Date of Patent: Sep. 3, 2019

(54) TRANSMISSION APPARATUS AND RECEPTION APPARATUS USING MOBILE FRONTHAUL

(71) Applicant: ELECTRONICS AND TELECOMMUNICATIONS RESEARCH INSTITUTE, Daejeon (KR)

(72) Inventor: Minkyu Sung, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 2 days.

(21) Appl. No.: 15/820,700

(22) Filed: Nov. 22, 2017

(65) Prior Publication Data
US 2018/0152245 A1 May 31, 2018

(30) Foreign Application Priority Data
Nov. 29, 2016 (KR) .................. 10-2016-0160851

(51) Int. Cl.
*H04W 56/00* (2009.01)
*H04B 10/2575* (2013.01)
*H04J 99/00* (2009.01)

(52) U.S. Cl.
CPC .... *H04B 10/25758* (2013.01); *H04W 56/001* (2013.01); *H04J 15/00* (2013.01)

(58) Field of Classification Search
CPC .......... H04B 10/25752; H04B 10/2575; H04B 10/25759; H04B 3/52; H04B 10/25758; H04B 10/40; H04B 10/506; H04B 10/2504; H04B 10/5053; H04B 10/5161; H04B 10/556; H04B 10/077
See application file for complete search history.

(56) References Cited

U.S. PATENT DOCUMENTS

| | | | |
|---|---|---|---|
| 7,088,922 B2 | 8/2006 | Tomofuji et al. | |
| 9,122,443 B1* | 9/2015 | Lamborn | G06F 3/1446 |
| 9,621,330 B2* | 4/2017 | Vassiliou | H04L 5/143 |
| 9,762,324 B2* | 9/2017 | Liu | H04J 14/00 |
| 9,967,003 B2* | 5/2018 | Zavadsky | H04B 7/04 |

(Continued)

FOREIGN PATENT DOCUMENTS

| | | |
|---|---|---|
| KR | 10-2001-0095866 A | 11/2001 |
| KR | 10-2014-0134557 A | 11/2014 |
| KR | 10-2016-0114458 A | 10/2016 |

OTHER PUBLICATIONS

Wake et al, "Radio over fiber link design for next generation wireless systems," J. Lightw. Technol., vol. 28, No. 16, pp. 2456-2464, Aug. 2010 (Year: 2010).*

(Continued)

*Primary Examiner* — Wutchung Chu
(74) *Attorney, Agent, or Firm* — LRK Patent Law Firm

(57) ABSTRACT

Structures of a transmission apparatus and a reception apparatus using a mobile fronthaul that transmit and receive a frequency synchronization signal and a management control signal using at least one of in-band signaling and wavelength division multiplexing (WDM) in a single band or multiple bands of a mobile fronthaul using an intermediate frequency-over-fiber (IFoF) based analog transmission scheme.

14 Claims, 17 Drawing Sheets

(56) References Cited

U.S. PATENT DOCUMENTS

| | | | |
|---|---|---|---|
| 10,027,413 B2* | 7/2018 | Liu | H04B 10/25 |
| 10,110,308 B2* | 10/2018 | Harel | H04B 1/40 |
| 10,117,247 B2* | 10/2018 | Zeng | H04W 72/0453 |
| 2006/0045524 A1* | 3/2006 | Lee | H04B 10/25752 |
| | | | 398/71 |
| 2006/0189353 A1* | 8/2006 | Fujishima | H04W 88/08 |
| | | | 455/561 |
| 2007/0053311 A1* | 3/2007 | Kim | H04W 88/085 |
| | | | 370/280 |
| 2007/0072646 A1* | 3/2007 | Kuwahara | H04W 88/085 |
| | | | 455/561 |
| 2007/0147273 A1* | 6/2007 | Lee | H04B 10/25758 |
| | | | 370/280 |
| 2008/0145056 A1* | 6/2008 | Boldi | H04J 14/0226 |
| | | | 398/96 |
| 2008/0145061 A1* | 6/2008 | Lee | H04B 10/25758 |
| | | | 398/139 |
| 2011/0268446 A1* | 11/2011 | Cune | H04B 10/25753 |
| | | | 398/79 |
| 2013/0209094 A1 | 8/2013 | Jeong et al. | |
| 2013/0209105 A1 | 8/2013 | Jeong et al. | |
| 2015/0229397 A1* | 8/2015 | Shibata | H04B 10/25754 |
| | | | 398/115 |
| 2015/0365934 A1* | 12/2015 | Liu | H04L 5/0039 |
| | | | 370/329 |
| 2016/0112119 A1* | 4/2016 | Vall-Llosera | H04B 10/40 |
| | | | 398/21 |
| 2016/0128085 A1* | 5/2016 | Liu | H04J 14/00 |
| | | | 398/96 |
| 2016/0218801 A1* | 7/2016 | Chung | H04B 10/07953 |
| 2016/0285553 A1* | 9/2016 | Cho | H04B 10/25759 |
| 2017/0093495 A1* | 3/2017 | Lozhkin | H04B 10/25753 |
| 2017/0126320 A1* | 5/2017 | Cho | H04B 10/25754 |
| 2018/0138979 A1* | 5/2018 | Shibata | H03M 7/30 |
| 2018/0152244 A1* | 5/2018 | Cho | H04B 10/25753 |
| 2018/0152246 A1* | 5/2018 | Cho | H04B 10/40 |
| 2018/0152248 A1* | 5/2018 | Sung | H04B 10/25753 |
| 2018/0159632 A1* | 6/2018 | Spagnolini | G02F 1/19 |
| 2018/0248626 A1* | 8/2018 | Bruno | H04B 10/0793 |

OTHER PUBLICATIONS

Yamazaki et al. "High-speed Electronic and Optical Device Technologies for Ultralarge-capacity Optical Transmission" NTT Technical Review, vol. 14 No. 1 Jan. 2015. https://www.ntt-review.jp/archive/ntttechnical.php?contents=ntr201601fa2.html (Year: 2015).*

* cited by examiner

TRANSMISSION APPARATUS AND RECEPTION APPARATUS USING MOBILE FRONTHAUL

CROSS-REFERENCE TO RELATED APPLICATION

This application claims the priority benefit of Korean Patent Application No. 10-2016-0160851, filed Nov. 29, 2016 in the Korean Intellectual Property Office, the disclosure of which is incorporated herein by reference for all purposes.

BACKGROUND

1. Field

One or more example embodiments relate to a transmission apparatus and a reception apparatus using a mobile fronthaul, and more particularly, a transmission apparatus and a reception apparatus that may transmit and receive a frequency synchronization signal and a management control signal in a mobile fronthaul using an intermediate frequency-over-fiber (IFoF) based analog transmission scheme.

2. Description of Related Art

C-RAN technology related to a next generation radio access network (RAN) is broadly divided into a cloud-RAN system and a centralized-RAN system.

Here, the C-RAN technology separates a digital unit (DU) and a radio unit (RU) conventionally at a single cell site, gathers and manages DUs being at each cell site in a single place, and disposes an RU at a cell site in which radio signals are transmitted and received in reality. The DU and the RU at different sites are connected to each other through an optical cable.

The DU and the RU transmit signals through the optical cable, and a section in which the signals are transmitted between the DU and the RU is referred to as a mobile fronthaul section in a C-RAN. Further, as a method of transmitting optical signals between the DU and the RU in the section, an IFoF based analog optical transmission scheme which is simply structured and cost-efficient is suggested as a technology to implement a mobile fronthaul of the C-RAN.

In this example, in the IFoF based mobile fronthaul, a mobile communication signal including a data signal, a frequency synchronization signal, and a management control signal need to be transmitted. The frequency synchronization signal is generated by the DU, and used for an IF conversion of the DU and an IF conversion of the RU. Similar to the frequency synchronization signal, the management control signal is generated by the DU. The DU monitors or controls the RU based on information to manage a state of the RU, the information being loaded on the generated management control signal.

In this example, a signal-to-noise ratio (SNR) degradation or a performance degradation by a non-linear signal distortion may occur in the frequency synchronization signal and the management control signal while being transmitted from the DU to the RU through the optical cable. The degradation may cause an overall deterioration of quality of the IFoF system.

Accordingly, a transmission structure for more efficiently transmitting a frequency synchronization signal and a management control signal through an optical cable is needed.

SUMMARY

An aspect provides a transmission apparatus and a reception apparatus for transmitting and receiving a frequency synchronization signal and a management control signal in an intermediate frequency-over-fiber (IFoF) based analog optical transmission mobile fronthaul.

According to an aspect, there is provided a transmission apparatus including a baseband digital signal generator configured to generate a single- or multi-channel baseband digital modulation signal using a data signal to be transmitted to a reception apparatus, a combiner configured to combine the generated single- or multi-channel baseband digital modulation signal, a digital-to-analog converter (DAC) configured to convert the digital modulation signal to an analog modulation signal, a frequency converter configured to convert the analog modulation signal to an intermediate frequency (IF) signal, a clock signal generator configured to generate a frequency synchronization signal to be used to convert the analog modulation signal to the IF signal, a management control signal generator configured to generate a management control signal to manage a state of the reception apparatus, and a radio-over-fiber (RoF) transmitter configured to convert a transmission signal to an optical signal and transmit the transmission signal in a form of the optical signal to the reception apparatus.

The transmission apparatus may further include an electrical combiner configured to combine at least one of the IF signal, the frequency synchronization signal, and the management control signal into a transmission signal. The transmission signal may be generated by combining the IF signal, the frequency synchronization signal and the management control signal through the electrical combiner.

The transmission apparatus may further include an optical transmitter configured to receive the frequency synchronization signal, an electrical combiner configured to combine at least one of the IF signal, the frequency synchronization signal, and the management control signal into a transmission signal, and a signal multiplexer configured to multiplex the frequency synchronization signal and the transmission signal, and transmit the multiplexed frequency synchronization signal and the multiplexed transmission signal to the reception apparatus. The transmission signal may be generated by combining the IF signal and the management control signal through the electrical combiner.

The transmission apparatus may further include an optical transmitter configured to receive the management control signal, an electrical combiner configured to combine at least one of the IF signal, the frequency synchronization signal, and the management control signal into a transmission signal, and a signal multiplexer configured to multiplex the management control signal and the transmission signal, and transmit the multiplexed management control signal and the multiplexed transmission signal to the reception apparatus. The transmission signal may be generated by combining the IF signal and the frequency synchronization signal through the electrical combiner.

The transmission apparatus may further include a first optical transmitter configured to receive the frequency synchronization signal, a second optical transmitter configured to receive the management control signal, and a signal multiplexer. The RoF transmitter may be configured to transmit the transmission signal in a form of the optical signal to the signal multiplexer, and the signal multiplexer may be configured to multiplex the frequency synchronization signal, the management control signal and the transmission signal, and transmit the multiplexed frequency synchronization signal, the multiplexed management control signal and the multiplexed transmission signal to the reception apparatus.

According to another aspect, there is also provided a reception apparatus including an RoF receiver configured to receive a transmission signal transmitted from a transmission apparatus, an electrical splitter configured to split the transmission signal into at least one of an IF signal, a frequency synchronization signal, and a management control signal, a frequency converter configured to convert the IF signal to an RF signal, an RF filter configured to filter the RF signal, and an antenna configured to output the filtered RF signal.

The reception apparatus may further include a synchronization signal filter configured to filter the frequency synchronization signal, and a control signal filter configured to filter the management control signal. The frequency converter may be configured to convert the IF signal to the RF signal using the filtered frequency synchronization signal.

The transmission signal may include i) the IF signal and the management control signal transmitted using in-band signaling, and ii) the frequency synchronization signal transmitted using WDM. The reception apparatus may further include a signal demultiplexer configured to divide the transmission signal in view of a scheme of transmitting the transmission signal, an optical receiver configured to receive the frequency synchronization signal divided from the transmission signal, and a control signal filter configured to filter the management control signal. The RoF receiver may be configured to receive the IF signal and the management control signal divided from the transmission signal, and the frequency converter may be configured to convert the IF signal to the RF signal using the frequency synchronization signal.

The transmission signal may include i) the IF signal and the frequency synchronization signal transmitted using in-band signaling, and ii) the management control signal transmitted using WDM. The reception apparatus may further include a signal demultiplexer configured to divide the transmission signal in view of a scheme of transmitting the transmission signal, an optical receiver configured to receive the management control signal divided from the transmission signal, a management controller configured to manage a state of the reception apparatus using the management control signal; and a synchronization signal filter configured to filter the frequency synchronization signal. The RoF receiver may be configured to receive the IF signal and the frequency synchronization signal divided from the transmission signal, and the frequency converter may be configured to convert the IF signal to the RF signal using the management control signal.

The reception apparatus may further include a signal demultiplexer configured to divide the transmission signal into the IF signal, the frequency synchronization signal, and the management control signal transmitted using WDM, a first optical receiver configured to receive the management control signal divided from the transmission signal, a management controller configured to manage a state of the reception apparatus using the management control signal, and a second optical receiver configured to receive the frequency synchronization signal divided from the transmission signal. The RoF receiver may be configured to receive the IF signal divided from the transmission signal, and the frequency converter may be configured to convert the IF signal to the RF signal using the frequency synchronization signal.

According to still another aspect, there is also provided a transmission apparatus including a baseband digital signal generator configured to generate a single- or multi-channel baseband digital modulation signal using a data signal to be transmitted to a reception apparatus, combiners each configured to combine the generated single- or multi-channel baseband digital modulation signal, DACs each configured to convert the digital modulation signal to an analog modulation signal, the DACs respectively corresponding to the combiners, frequency converters each configured to convert the analog modulation signal to an IF signal, the frequency converters respectively corresponding to the DACs, a clock signal generator configured to generate a frequency synchronization signal to be used to convert the analog modulation signal to the IF signal, a management control signal generator configured to generate a management control signal to manage a state of the reception apparatus, and an RoF transmitter configured to convert a transmission signal to an optical signal and transmit the transmission signal in a form of the optical signal to the reception apparatus.

The transmission apparatus may further include an electrical combiner configured to combine at least one of the IF signal, the frequency synchronization signal, and the management control signal into a transmission signal. The transmission signal may be generated by combining the IF signal, the frequency synchronization signal, and the management control signal through the electrical combiner.

The transmission apparatus may further include an optical transmitter configured to receive the frequency synchronization signal, an electrical combiner configured to combine at least one of the IF signal, the frequency synchronization signal, and the management control signal into a transmission signal, and a signal multiplexer configured to multiplex the frequency synchronization signal and the transmission signal, and transmit the multiplexed frequency synchronization signal and the multiplexed transmission signal to the reception apparatus. The transmission signal may be generated by combining the IF signal and the management control signal through the electrical combiner.

The transmission apparatus may further include an optical transmitter configured to receive the management control signal, an electrical combiner configured to combine at least one of the IF signal, the frequency synchronization signal, and the management control signal into a transmission signal, and a signal multiplexer configured to multiplex the management control signal and the transmission signal, and transmit the multiplexed management control signal and the multiplexed transmission signal to the reception apparatus. The transmission signal may be generated by combining the IF signal and the frequency synchronization signal through the electrical combiner.

The transmission apparatus may further include a first optical transmitter configured to receive the frequency synchronization signal, a second optical transmitter configured to receive the management control signal, and a signal multiplexer. The RoF transmitter may be configured to transmit the transmission signal in a form of the optical signal to the signal multiplexer, and the signal multiplexer may be configured to multiplex the frequency synchronization signal, the management control signal, and the transmission signal, and transmit the multiplexed frequency synchronization signal, the multiplexed management control signal and the multiplexed transmission signal to the reception apparatus.

According to further another aspect, there is also provided a reception apparatus including an RoF receiver configured to receive a transmission signal transmitted from a transmission apparatus, an electrical splitter configured to split the transmission signal into at least one of an IF signal, a frequency synchronization signal, and a management control signal, frequency converters each configured to convert the IF signal to an RF signal, RF filters each configured to filter the RF signal, the RF filters respectively corresponding to the frequency converters, and antennas each configured to output the filtered RF signal.

The transmission signal may be transmitted through a single wavelength using in-band signaling. The reception apparatus may further include a synchronization signal filter configured to filter the frequency synchronization signal, and a control signal filter configured to filter the management control signal. The frequency converters may each be configured to convert the IF signal to the RF signal using the filtered frequency synchronization signal.

The transmission signal may include i) the IF signal and the management control signal transmitted using in-band signaling, and ii) the frequency synchronization signal transmitted using WDM. The reception apparatus may further include a signal demultiplexer configured to divide the transmission signal in view of a scheme of transmitting the transmission signal, an optical receiver configured to receive the frequency synchronization signal divided from the transmission signal, and a control signal filter configured to filter the management control signal. The RoF receiver may be configured to receive the IF signal and the management control signal divided from the transmission signal, and frequency converters may each be configured to convert the IF signal to the RF signal using the frequency synchronization signal.

The transmission signal may include i) the IF signal and the frequency synchronization signal transmitted using in-band signaling, and ii) the management control signal transmitted using WDM. The reception apparatus may further include a signal demultiplexer configured to divide the transmission signal in view of a scheme of transmitting the transmission signal, an optical receiver configured to receive the management control signal divided from the transmission signal, a management controller configured to manage a state of the reception apparatus using the management control signal, and a synchronization signal filter configured to filter the frequency synchronization signal. The RoF receiver may be configured to receive the IF signal and the frequency synchronization signal divided from the transmission signal, and the frequency converters may each be configured to convert the IF signal to the RF signal using the management control signal.

The reception apparatus may further include a signal demultiplexer configured to divide the transmission signal into the IF signal, the frequency synchronization signal, and the management control signal transmitted using WDM, a first optical receiver configured to receive the management control signal divided from the transmission signal, a management controller configured to manage a state of the reception apparatus using the management control signal, a second optical receiver configured to receive the frequency synchronization signal divided from the transmission signal, and a synchronization signal controller configured to control the frequency synchronization signal. The RoF receiver may be configured to receive the IF signal divided from the transmission signal, and the frequency converters may each be configured to convert the IF signal to the RF signal using the frequency synchronization signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
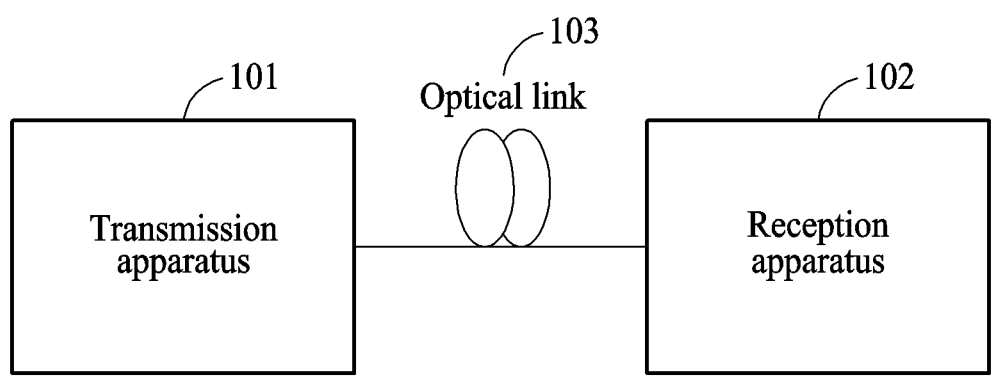
FIG. 1 is a diagram illustrating a transmission apparatus and a reception apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a transmission apparatus and a reception apparatus according to an example embodiment.

Referring to FIG. 1, a mobile communication network may include a transmission apparatus 101 and a reception apparatus 102.

The transmission apparatus 101 and the reception apparatus 102 may be implemented using a cloud/centralized-radio access network (C-RAN) which is a next generation radio access network. The transmission apparatus 101 and the reception apparatus 102 conventionally at a single cell site may be separated from each other. In an example, the transmission apparatus 101 may correspond to a digital unit (DU) of the mobile communication network, and the reception apparatus 102 may correspond to a radio unit (RU) of the mobile communication network.

The transmission apparatus 101 may process a single- or multi-channel baseband signal, and the reception apparatus 102 may generate a mobile signal by modulating the processed baseband signal into a radio frequency (RF) signal. The reception apparatus 102 may output the generated mobile signal to user equipment UE using each antenna.

Here, the transmission apparatus 101 may convert a combination of the single- or multi-channel baseband modulation signal and a corresponding carrier signal to an intermediate frequency (IF) carrier. That is, the transmission apparatus 101 may incorporate the modulation signal in the IF carrier by loading the modulation signal on the IF carrier of a predetermined frequency. The transmission apparatus 101 may combine a plurality of IF carriers and multiplex the combined IF carriers, thereby transmitting a number of modulation signals simultaneously through a single optical link 103.

In this example, when transmitting an optical signal to the reception apparatus 102, the transmission apparatus 101 may additionally transmit an IF carrier, a frequency synchronization signal to be used to combine waveforms of frequency signals, and a management control signal to be used to manage a state of the reception apparatus 102. In detail, the transmission apparatus 101 may generate the frequency synchronization signal and the management control signal. Here, the frequency synchronization signal may be used to convert the single- or multi-channel baseband modulation signal to the IF signal, and convert the IF signal to an RF signal in the reception apparatus 102. The management control signal may include information to sense or control the state of the reception apparatus 102. The transmission apparatus 101 may monitor or control the state of the reception apparatus 102 based on the information loaded on the management control signal.

The transmission apparatus 101 may use in-band signaling and wavelength division multiplexing (WDM) to transmit the frequency synchronization signal and the management control signal to the reception apparatus 102 in an IF-over-fiber (IFoF) based analog optical transmission mobile fronthaul. FIGS. 2 through 9 illustrate various structures of the transmission apparatus 101 and the reception apparatus 102 that transmits and receives the frequency synchronization signal and the management control signal using in-band signaling and WDM.

Figure 2A:
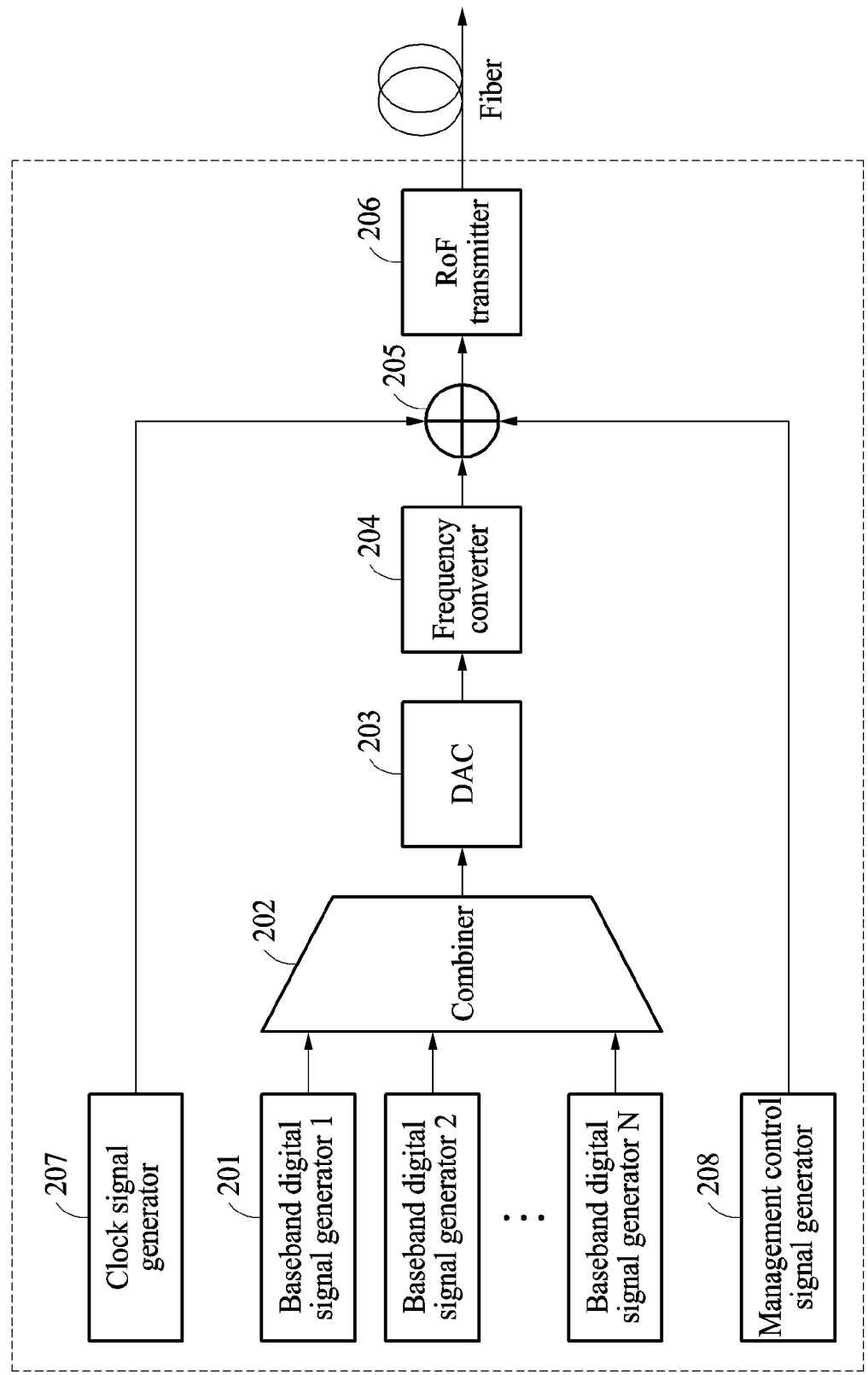
FIG. 2A is a diagram illustrating a transmission apparatus that transmits a frequency synchronization signal and a management control signal using in-band signaling in a single band according to an example embodiment.

FIG. 2A is a diagram illustrating a transmission apparatus that transmits a frequency synchronization signal and a management control signal using in-band signaling in a single band according to an example embodiment.

Referring to FIG. 2A, a transmission apparatus of a single-band IFoF system has an in-band transmission structure to transmit a frequency synchronization signal and a management control signal together with a mobile communication signal, that is, an IF signal, in a form of IF. The transmission apparatus may include baseband digital signal generators 201, a combiner 202, a digital-to-analog converter (DAC) 203, a frequency converter 204, an electrical combiner 205, a radio-over-fiber (RoF) transmitter 206, a clock signal generator 207, and a management control signal generator 208.

The baseband digital signal generators 201 may each generate a single- or multi-channel baseband modulation signal using a data signal to be transmitted to a reception apparatus. The baseband digital signal generators 201 may each express the data signal to be transmitted to the reception apparatus in a form suitable for short distance transmission or a form suitable for being loaded on a carrier using a digital signal. In an example, the baseband digital signal generators 201 may each be implemented using baseband digital signal modulation that modulates the data signal to be transmitted to the reception apparatus. Further, the plurality of baseband digital signal generators 201 may each generate at least one digital baseband modulation signal, corresponding to a single channel or multiple channels, for mobile communication. In this example, the modulation signal may be generated in a form of a digital modulation signal.

The combiner 202 may combine a plurality of digital modulation signals generated by at least one of the baseband digital signal generators 201. The combined digital modulation signals may be multiplexed. In an example, the combiner 202 may be a channel aggregator configured to more intensively transmit the signals generated by the baseband digital signal generators 201 to users.

The DAC 203 may convert the digital modulation signal to an analog modulation signal. In detail, the DAC 203 may receive the digital modulation signal as an input, and convert the digital modulation signal to an analog modulation signal that generates an analog quantity (mainly a voltage) that continuously represent the digital modulation signal. In an example, the DAC 203 may be a DAC configured to convert a digital signal to an analog signal.

The frequency converter 204 may convert the analog modulation signal to an IF signal. In detail, the frequency converter 204 may convert the analog modulation signal to the IF signal by combining the analog modulation signal with a carrier signal. That is, the frequency converter 204 may incorporate the analog modulation signal in the IF signal by loading the modulation signal on the IF signal of a predetermined frequency. In an example, the frequency converter 204 may be an IF up-convertor configured to change a frequency band of the analog modulation signal to an IF band.

The clock signal generator 207 may generate a frequency synchronization signal to be used to convert the analog modulation signal to the IF signal. In an example, the clock signal generator 207 may be a clock signal generator configured to generate a periodic signal to be used for synchronization.

The management control signal generator 208 may generate a management control signal to manage a state of the reception apparatus. In an example, the management control signal generator 208 may be a control and manager (C&M) signal generator configured to generate a signal to manage the reception apparatus.

The electrical combiner 205 may combine at least one of the IF signal, the frequency synchronization signal, and the management control signal into a transmission signal. That is, the electrical combiner 205 may multiplex the IF signal, the frequency synchronization signal, and the management control signal in a form of IF.

The RoF transmitter 206 may convert the transmission signal to an optical signal and transmit the transmission signal in a form of the optical signal to the reception apparatus. Here, the RoF transmitter 206 may multiplex the frequency synchronization signal (clock signal) and the management control signal (C&M signal) with the IF signal in a form of IF, and transmit the signals to the reception apparatus by being loaded on a single optical wavelength, using a scheme of IF multiplexing and transmitting the baseband digital modulation signal.

Figure 2B:
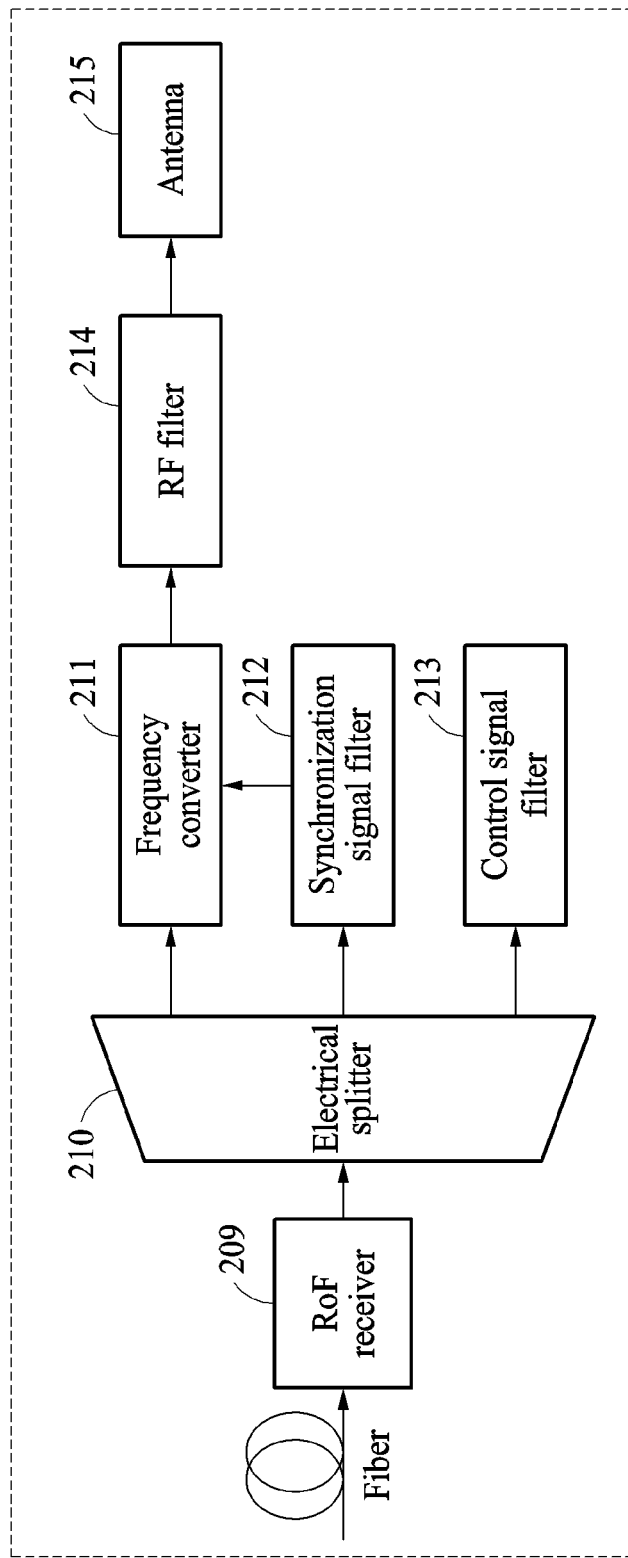
FIG. 2B is a diagram illustrating a reception apparatus that receives a frequency synchronization signal and a management control signal using in-band signaling in a single band according to an example embodiment.

FIG. 2B is a diagram illustrating a reception apparatus that receives a frequency synchronization signal and a management control signal using in-band signaling in a single band according to an example embodiment.

Referring to FIG. 2B, a reception apparatus of a single-band IFoF system has an in-band transmission structure to receive a frequency synchronization signal and a management control signal together with a mobile communication signal, that is, an IF signal, in a form of IF. The reception apparatus may include an RoF receiver 209, an electrical splitter 210, a frequency converter 211, a synchronization signal filter 212, a control signal filter 213, an RF filter 214, and an antenna 215.

The RoF receiver 209 may receive a transmission signal transmitted from a transmission apparatus. In an example, the RoF receiver 209 may be an RoF transmitter configured to receive a transmission signal in a form of an optical signal.

The electrical splitter 210 may split the transmission signal into at least one of an IF signal, a frequency synchronization signal, and a management control signal. In an example, the electrical splitter 210 may be a control splitter.

The synchronization signal filter 212 may filter the frequency synchronization signal split from the transmission signal by the electrical splitter 210. In an example, the synchronization signal filter 212 may be a band-pass filter configured to filter the frequency synchronization signal.

The control signal filter 213 may filter the management control signal split from the transmission signal by the electrical splitter 210. In an example, the control signal filter 213 may be a band-pass filter configured to filter the management control signal.

The frequency converter 211 may convert the IF signal split from the transmission signal by the electrical splitter 210 to an RF signal. In this example, the frequency converter 211 may convert the IF signal to the RF signal using the frequency synchronization signal filtered by the control signal filter 213. In an example, the frequency converter 211 may be an IF-to-RF convertor configured to generate a mobile signal. The RF filter 214 may filter the RF signal in view of a predetermined frequency band or a preset band. The antenna 215 may transmit the filtered RF signal to a mobile. In this example, the RF signal may correspond to a mobile signal.

Here, the reception apparatus may convert an optical signal received from the transmission apparatus to an electrical signal, divide the electrical signal into a frequency synchronization signal and a management control signal, and use the frequency synchronization signal and the management control signal for a management and control function and a frequency synchronization function, respectively, through the elements described above. The transmission apparatus of FIG. 2A and the reception apparatus of FIG. 2B may operate as a single system which is most efficient in an aspect of costs since all three signals may be transmitted using a single wavelength. However, a signal-to-noise ratio (SNR) degradation or a performance degradation by a non-linear signal distortion may occur in each signal.

Figure 3A:
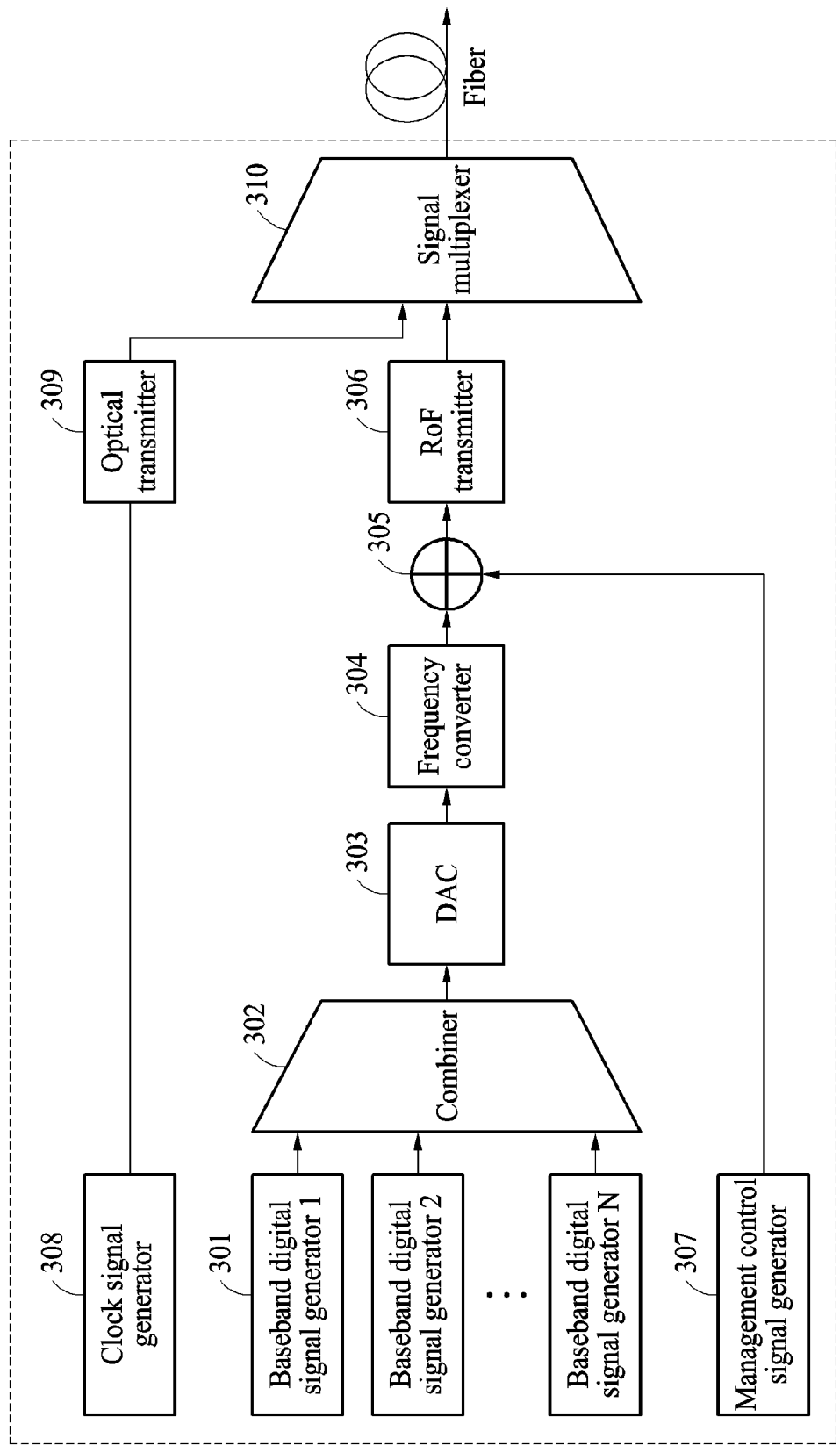
FIG. 3A is a diagram illustrating a transmission apparatus that transmits a frequency synchronization signal and a management control signal using in-band signaling and wavelength division multiplexing (WDM) in a single band according to an example embodiment.

FIG. 3A is a diagram illustrating a transmission apparatus that transmits a frequency synchronization signal and a management control signal using in-band signaling and WDM in a single band according to an example embodiment.

Referring to FIG. 3A, a transmission apparatus of a single-band IFoF system has a structure to transmit an IF signal and a management control signal using in-band signaling, and transmit a frequency synchronization signal using WDM. In detail, a performance degradation may occur at an IF-to-RF converter of a reception apparatus based on a quality of the frequency synchronization signal received from the transmission apparatus. Thus, the quality of the frequency synchronization signal needs to be guaranteed.

However, when the frequency synchronization signal is transmitted simultaneously with the management control signal and the IF signal as in the example of FIGS. 2A and 2B, the quality of the frequency synchronization signal may be degraded. Hence, the transmission apparatus may transmit the signals to the reception apparatus using different transmission schemes.

The transmission apparatus may include baseband digital signal generators 301, a combiner 302, a DAC 303, a frequency converter 304, an electrical combiner 305, an RoF transmitter 306, a clock signal generator 308, and a management control signal generator 307. The transmission apparatus may further include an optical transmitter 309 and a signal multiplexer 310 to transmit the frequency synchronization signal to the reception apparatus using WDM.

The baseband digital signal generators 301, the combiner 302, the DAC 303, the frequency converter 304, and the management control signal generator 307 of the transmission apparatus of FIG. 3A may perform the same operations described in the example of FIG. 2A, and thus duplicate description will be omitted herein. Elements differing from those described in the example of FIG. 2A will be described additionally.

The clock signal generator 308 may generate a frequency synchronization signal to be used to convert an analog modulation signal to an IF signal. The clock signal generator 308 may transmit the generated frequency synchronization signal to the optical transmitter 309. Here, to prevent a degradation of the frequency synchronization signal, the frequency synchronization signal may be transmitted to the optical transmitter 309 which is present separately from the RoF transmitter 306.

The optical transmitter 309 may transmit the frequency synchronization signal to the signal multiplexer 310.

The electrical combiner 305 may combine the IF signal and the management control signal into a single transmission signal. That is, the electrical combiner 305 may combine the IF signal and the management control signal into a single signal to be transmitted using in-band signaling.

The RoF transmitter 306 may convert the transmission signal from an electrical signal to an optical signal, and transmit the transmission signal in a form of the optical signal to the signal multiplexer 310. Here, the transmission signal in a form of the optical signal may pass through the signal multiplexer 310 and be transmitted to the reception apparatus through an optical link using in-band signaling.

The signal multiplexer 310 may multiplex the frequency synchronization signal received from the optical transmitter 309, and transmit the multiplexed frequency synchronization signal to the reception apparatus through the optical link. In an example, the signal multiplexer 310 may be a frequency-division multiplexing (FDM) based multiplexer configured to perform multiplexing by dividing a single communication path into frequency bands to transmit a number of independent signals through the single communication path.

Figure 3B:
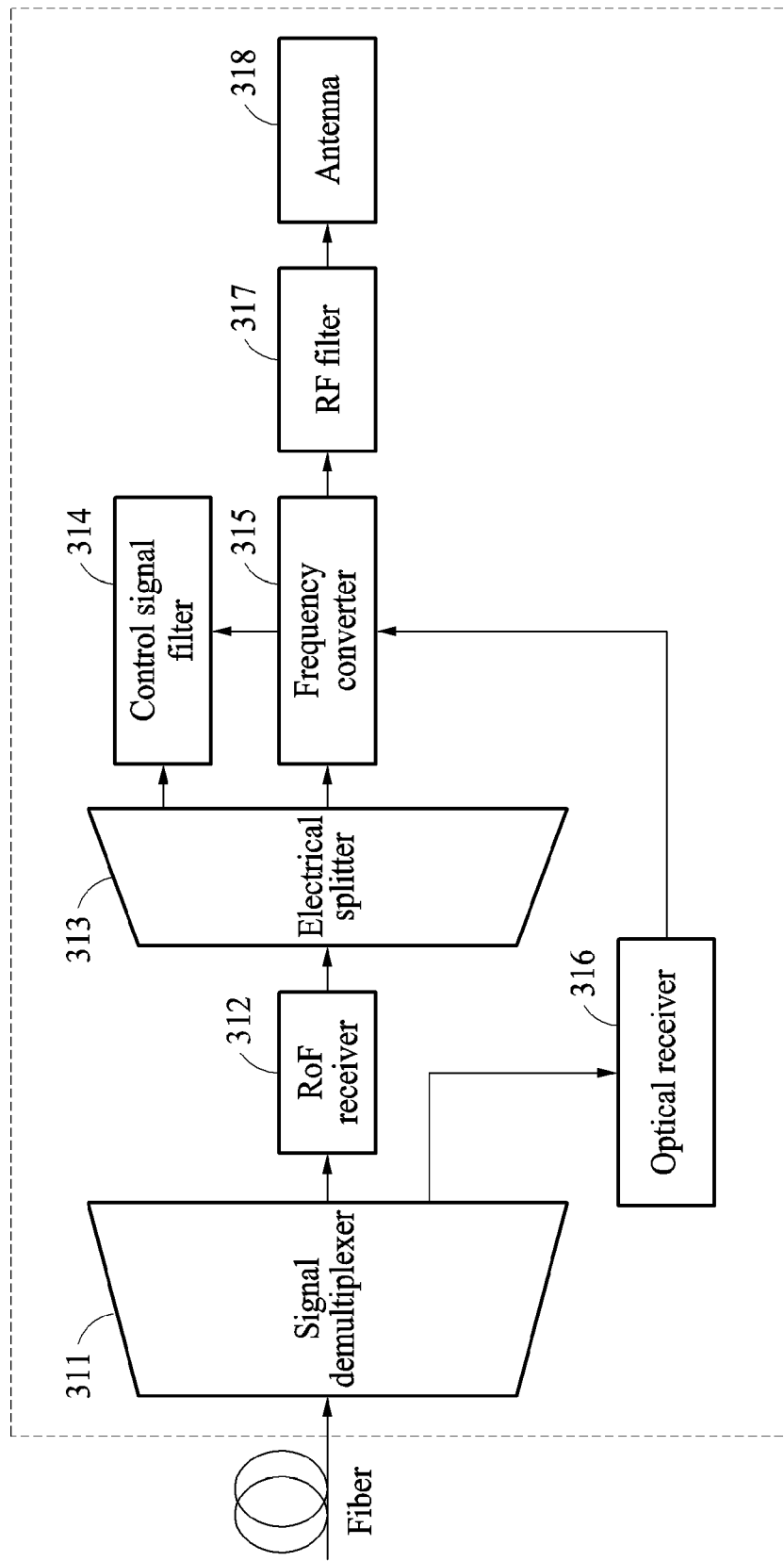
FIG. 3B is a diagram illustrating a reception apparatus that receives a frequency synchronization signal and a management control signal using in-band signaling and WDM in a single band according to an example embodiment.

FIG. 3B is a diagram illustrating a reception apparatus that receives a frequency synchronization signal and a management control signal using in-band signaling and WDM in a single band according to an example embodiment.

Referring to FIG. 3B, a reception apparatus of a single-band IFoF system has a structure to receive an IF signal and a management control signal using in-band signaling, and receive a frequency synchronization signal using WDM.

The reception apparatus may include an RoF receiver 312, an electrical splitter 313, a frequency converter 315, a control signal filter 314, an RF filter 317, and an antenna 318. The reception apparatus may further include an optical receiver 316 and a signal demultiplexer 311 to receive a frequency synchronization signal.

The control signal filter 314, the RF filter 317, and the antenna 318 of the reception apparatus of FIG. 3B may perform the same operations described in the example of FIG. 2B, and thus duplicate description will be omitted herein. Elements differing from those described in the example of FIG. 2B will be described additionally.

The signal demultiplexer 311 may receive the frequency synchronization signal transmitted from the signal multiplexer 310 of the transmission apparatus of FIG. 3A. In this example, the frequency synchronization signal is a signal multiplexed by the signal multiplexer 310. Thus, the signal demultiplexer 311 may restore the multiplexed frequency synchronization signal to the original independent signal, and transmit the restored frequency synchronization signal to the optical receiver 316. In an example, the signal demultiplexer 311 may be an FDM based demultiplexer configured to restore original signals by dividing a multiplexed composite signal.

The RoF receiver 312 may receive the transmission signal from the transmission apparatus of FIG. 3A and convert the received transmission signal from an optical signal to an electrical signal.

The electrical splitter 313 may split the transmission signal converted to the electrical signal through the RoF receiver 312 into an IF signal and a management control signal. The electrical splitter 313 may transmit the IF signal and the management control signal to the frequency converter 315 and the control signal filter 314, respectively.

The frequency converter 315 may convert the IF signal received from the electrical splitter 313 to an RF signal. In this example, the frequency converter 315 may receive the frequency synchronization signal from the optical receiver 316, and convert the IF signal to the RF signal using the received frequency synchronization signal.

Here, the transmission apparatus of FIG. 3A and the reception apparatus of FIG. 3B may operate as a single system. In this example, by separately transmitting the frequency synchronization signal using FDM, a quality of the frequency synchronization signal to be used by the reception apparatus to convert the IF signal to the RF signal may improve.

However, the system may increase costs to additionally install a multiplexer/demultiplexer in the transmission apparatus of FIG. 3A and the reception apparatus of FIG. 3B to support FDM.

Figure 4A:
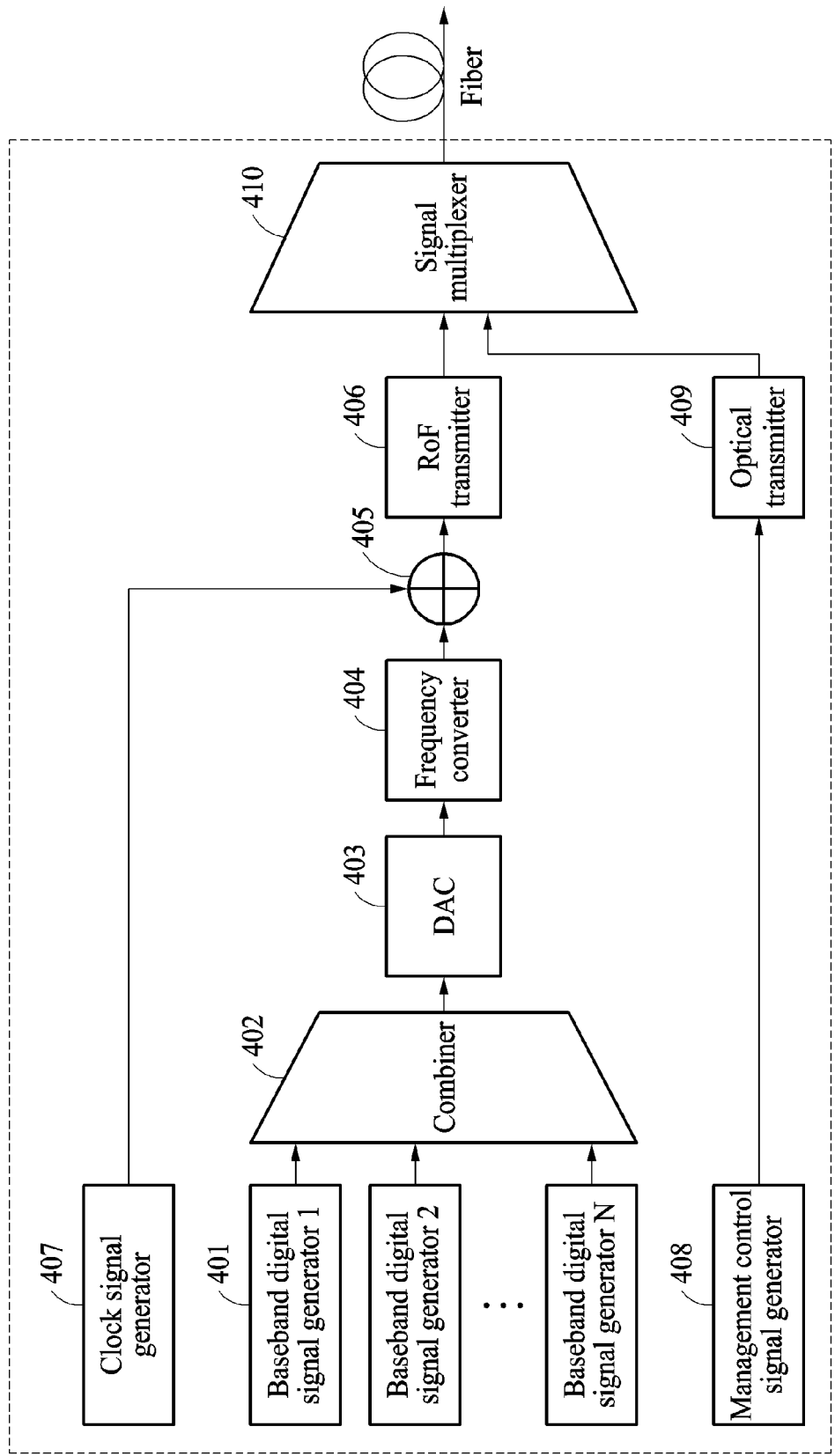
FIG. 4A is a diagram illustrating a transmission apparatus that transmits a frequency synchronization signal and a management control signal using in-band signaling and WDM in a single band according to another example embodiment.

FIG. 4A is a diagram illustrating a transmission apparatus that transmits a frequency synchronization signal and a management control signal using in-band signaling and WDM in a single band according to another example embodiment.

Referring to FIG. 4A, a transmission apparatus of a single-band IFoF system has a structure to transmit an IF signal and a frequency synchronization signal using in-band signaling, and transmit a management control signal using WDM.

The transmission apparatus may include baseband digital signal generators 401, a combiner 402, a DAC 403, a frequency converter 404, an electrical combiner 405, an RoF transmitter 406, a clock signal generator 407, and a management control signal generator 408. The transmission apparatus may further include an optical transmitter 409 and a signal multiplexer 410 to transmit the management control signal to a reception apparatus using WDM.

The baseband digital signal generators 401, the combiner 402, the DAC 403, the frequency converter 404, and the clock signal generator 407 of the transmission apparatus of FIG. 4A may perform the same operations described in the example of FIG. 2A, and thus duplicate description will be omitted herein. Elements differing from those described in the example of FIG. 2A will be described additionally.

The management control signal generator 408 may generate a management control signal to monitor and control a state of the reception apparatus. The management control signal generator 408 may transmit the generated management control signal to the optical transmitter 409. Here, to improve a quality of the management control signal, the management control signal may be transmitted to the optical transmitter 409 which is present separately from the RoF transmitter 406.

The optical transmitter 409 may transmit the management control signal to the signal multiplexer 410.

The electrical combiner 405 may combine the IF signal and the frequency synchronization signal into a single transmission signal. That is, the electrical combiner 405 may combine the IF signal and the frequency synchronization signal into a single signal to be transmitted using in-band signaling.

The RoF transmitter 406 may convert the transmission signal from an electrical signal to an optical signal, and transmit the transmission signal in a form of the optical signal to the signal multiplexer 410. Here, the transmission signal in a form of the optical signal may pass through the signal multiplexer 410 and be transmitted to the reception apparatus through an optical link using in-band signaling.

The signal multiplexer 410 may multiplex the management control signal received from the optical transmitter 409 using FDM, and transmit the multiplexed management control signal to the reception apparatus through the optical link.

Figure 4B:
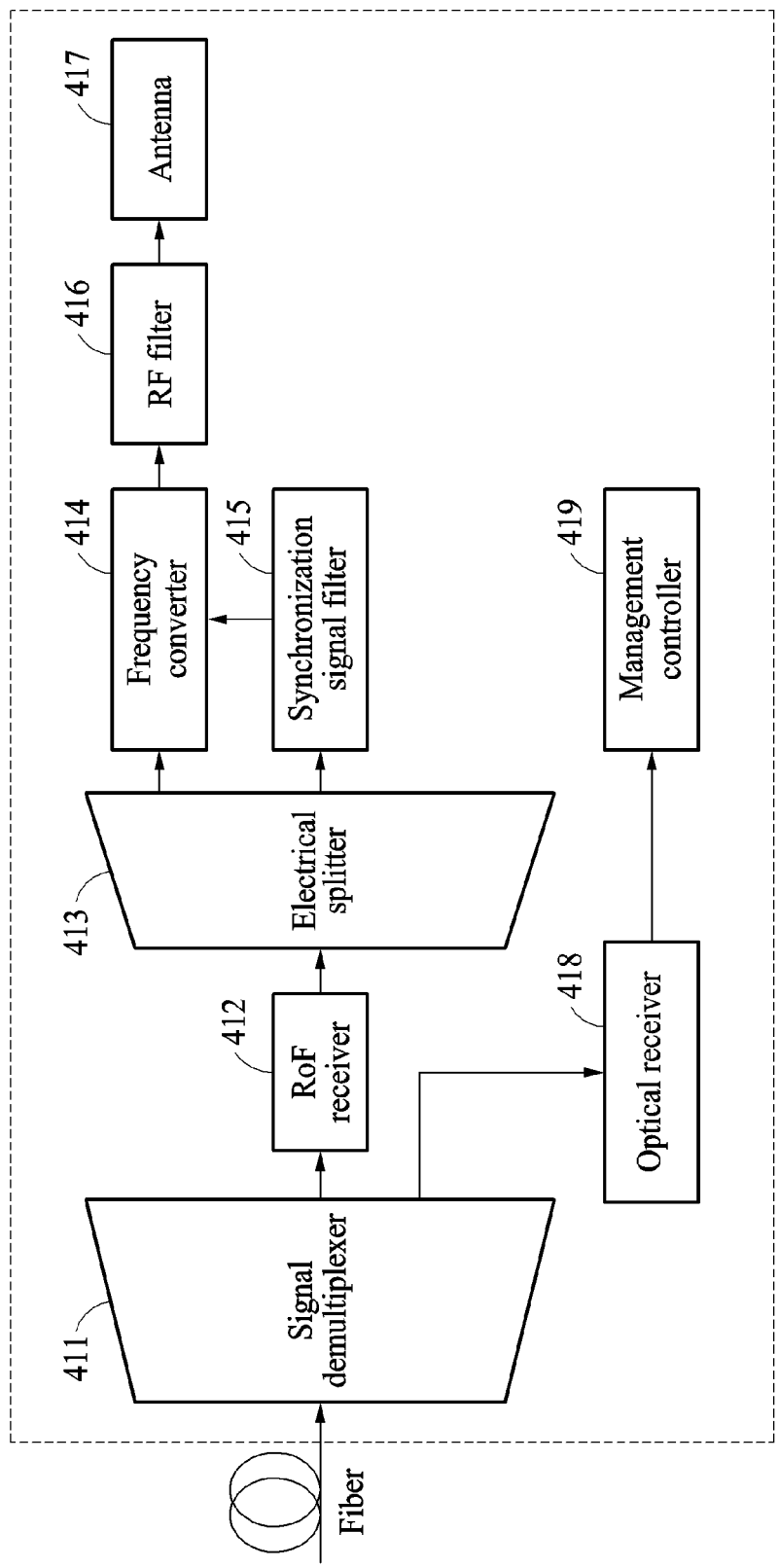
FIG. 4B is a diagram illustrating a reception apparatus that receives a frequency synchronization signal and a management control signal using in-band signaling and WDM in a single band according to another example embodiment.

FIG. 4B is a diagram illustrating a reception apparatus that receives a frequency synchronization signal and a management control signal using in-band signaling and WDM in a single band according to another example embodiment.

Referring to FIG. 4B, a reception apparatus of a single-band IFoF system has a structure to receive an IF signal and a frequency synchronization signal using in-band signaling, and receive a management control signal using WDM.

The reception apparatus may include an RoF receiver 412, an electrical splitter 413, a frequency converter 414, a synchronization signal filter 415, an RF filter 316, and an antenna 417. The reception apparatus may further include an optical receiver 418, a management controller 419, and a signal demultiplexer 411 to receive a management control signal.

The frequency converter 414, the synchronization signal filter 415, the RF filter 416, and the antenna 417 of the reception apparatus of FIG. 4B may perform the same operations described in the example of FIG. 2B, and thus duplicate description will be omitted herein. Elements differing from those described in the example of FIG. 2B will be described additionally.

The signal demultiplexer 411 may receive the management control signal transmitted from the signal multiplexer 410 of the transmission apparatus of FIG. 4A. In this example, the management control signal is a signal multiplexed by the signal multiplexer 410. Thus, the signal demultiplexer 411 may restore the multiplexed management control signal to the original independent signal, and transmit the restored management control signal to the optical receiver 418.

The optical receiver 418 may transmit the management control signal received from the signal demultiplexer 411 to the management controller 419. The management controller 419 may monitor a state of the reception apparatus using the management control signal.

The RoF receiver 412 may receive the transmission signal from the transmission apparatus of FIG. 4A and convert the received transmission signal from an optical signal to an electrical signal.

The electrical splitter 413 may split the transmission signal converted to the electrical signal through the RoF receiver 412 into an IF signal and a frequency synchronization signal. The electrical splitter 413 may transmit the IF signal and the frequency synchronization signal to the frequency converter 414 and the synchronization signal filter 415, respectively.

Here, the transmission apparatus of FIG. 4A and the reception apparatus of FIG. 4B may operate as a single system. In this example, by separately transmitting the management control signal using FDM, a quality of the management control signal may improve in comparison to a case of being transmitted using in-band signaling.

However, the system may increase costs to additionally install a multiplexer/demultiplexer in the transmission apparatus of FIG. 4A and the reception apparatus of FIG. 4B to support FDM.

Figure 5A:
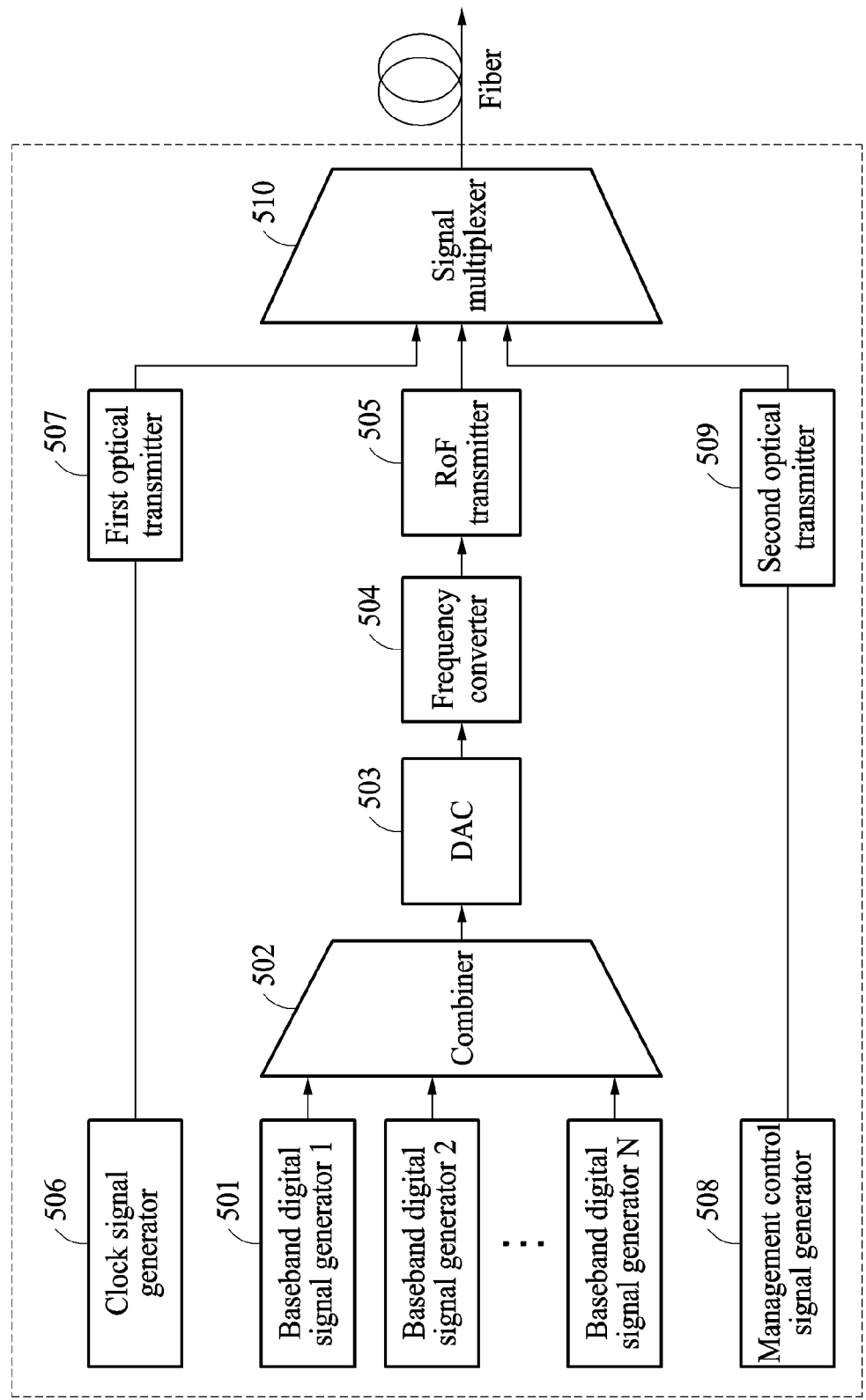
FIG. 5A is a diagram illustrating a transmission apparatus that transmits a frequency synchronization signal and a management control signal using WDM in a single band according to an example embodiment.

FIG. 5A is a diagram illustrating a transmission apparatus that transmits a frequency synchronization signal and a management control signal using WDM in a single band according to an example embodiment.

Referring to FIG. 5A, a transmission apparatus of a single-band IFoF system has a structure to transmit an IF signal, a frequency synchronization signal, and a management control signal using WDM.

The transmission apparatus may include baseband digital signal generators 501, a combiner 502, a DAC 503, a frequency converter 504, an RoF transmitter 505, a clock signal generator 506, and a management control signal generator 508. The transmission apparatus may further include a first optical transmitter 507, a second optical transmitter 509, and a signal multiplexer 510 to transmit the IF signal, the frequency synchronization signal, and the management control signal to a reception apparatus using WDM.

The baseband digital signal generators 501, the combiner 502, the DAC 503, and the frequency converter 504 of the transmission apparatus of FIG. 5A may perform the same operations described in the example of FIG. 2A, and thus duplicate description will be omitted herein. Elements differing from those described in the example of FIG. 2A will be described additionally.

The clock signal generator 506 may generate a frequency synchronization signal to be used to convert an analog modulation signal to an IF signal. The clock signal generator 506 may transmit the frequency synchronization signal to the first optical transmitter 507. The first optical transmitter 507 may transmit the frequency synchronization signal to the signal multiplexer 510.

The RoF transmitter 505 may convert the IF signal from an electrical signal to an optical signal. The RoF transmitter 505 may transmit the IF signal in a form of the optical signal to the signal multiplexer 510.

The management control signal generator 508 may generate a management control signal to manage a state of the reception apparatus. The management control signal generator 508 may transmit the management control signal to the second optical transmitter 509. The second optical transmitter 509 may transmit the management control signal to the signal multiplexer 510.

The signal multiplexer 510 may multiplex the IF signal, the frequency synchronization signal, and the management control signal using WDM. Here, the signal multiplexer 510 may transmit the frequency synchronization signal and the management control signal to the reception apparatus using different wavelengths.

Figure 5B:
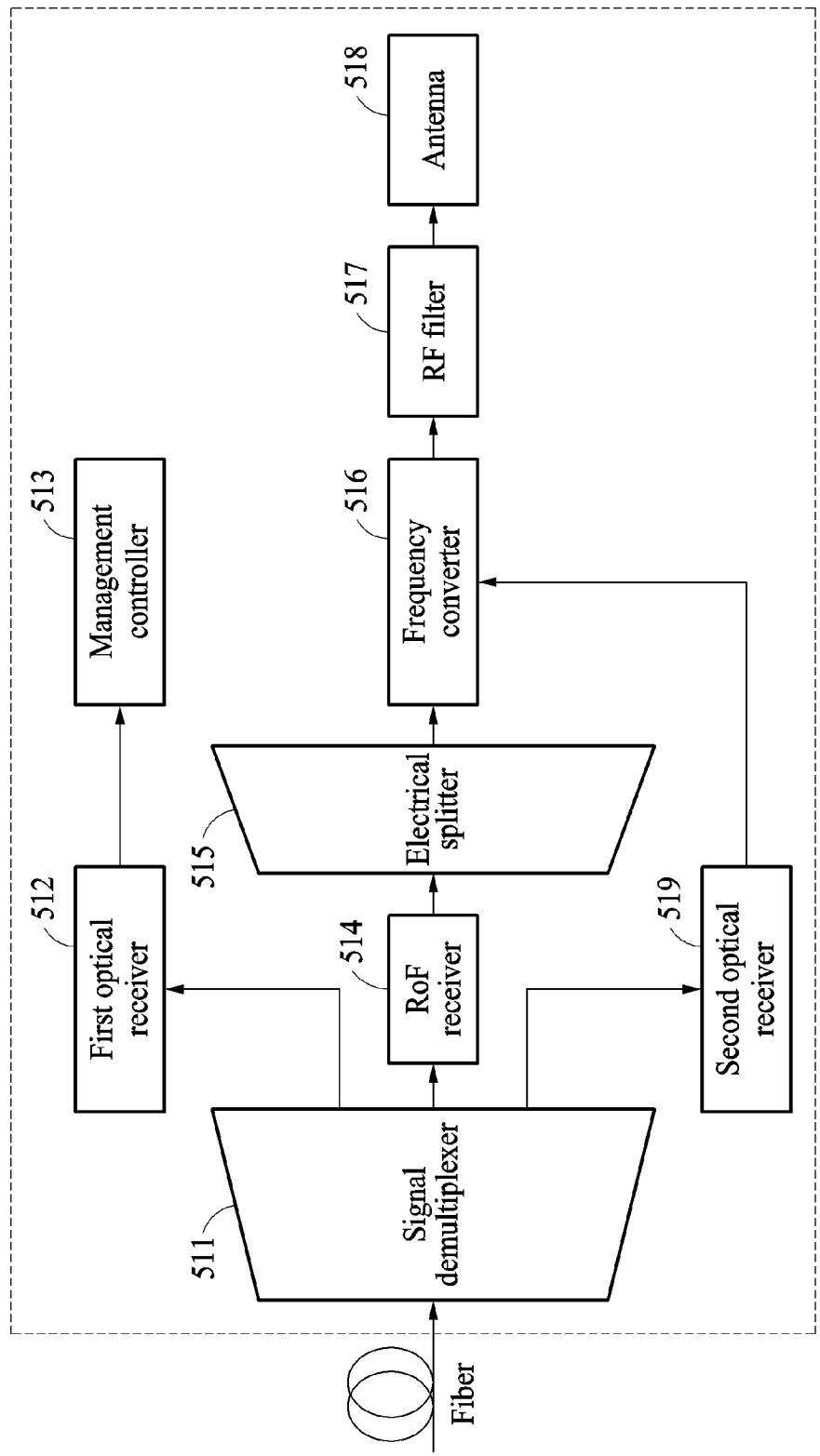
FIG. 5B is a diagram illustrating a reception apparatus that receives a frequency synchronization signal and a management control signal using WDM in a single band according to an example embodiment.

FIG. 5B is a diagram illustrating a reception apparatus that receives a frequency synchronization signal and a management control signal using WDM in a single band according to an example embodiment.

Referring to FIG. 5B, a reception apparatus of a single-band IFoF system has a structure to receive an IF signal, a frequency synchronization signal, and a management control signal using WDM.

The reception apparatus may include an RoF receiver 514, an electrical splitter 515, a frequency converter 516, an RF filter 517, and an antenna 518. The reception apparatus may further include a first optical receiver 512, a management controller 513, a second optical receiver 519, and a signal demultiplexer 511 to receive the IF signal, the frequency synchronization signal, and the management control signal transmitted using WDM.

The RF filter 517 and the antenna 518 of the reception apparatus of FIG. 5B may perform the same operations described in the example of FIG. 2B, and thus duplicate description will be omitted herein. Elements differing from those described in the example of FIG. 2B will be described additionally.

The signal demultiplexer 511 may receive the IF signal, the frequency synchronization signal, and the management control signal using WDM. The signal demultiplexer 511 may restore signals corresponding to the IF signal, the frequency synchronization signal, and the management control signal, respectively. The signal demultiplexer 511 may transmit the management control signal to the first optical receiver 512, transmit the IF signal to the RoF receiver 514, and transmit the frequency synchronization signal to the second optical receiver 519.

The first optical receiver 512 may receive the management control signal from the signal demultiplexer 511, and transmit the received management control signal to the management controller 513. The management controller 513 may monitor and control the state of the reception apparatus using the received management control signal.

The second optical receiver 519 may receive the frequency synchronization signal from the signal demultiplexer 511, and transmit the received frequency synchronization signal to the frequency converter 516.

The RoF receiver 514 may receive the IF signal from the signal demultiplexer 511, convert the IF signal from an optical signal to an electrical signal, and transmit the IF signal in a form of the optical signal to the electrical splitter 515. The electrical splitter 515 may transmit the IF signal received from the RoF receiver 514 to the frequency converter 516.

The frequency converter 516 may convert the IF signal to an RF signal using the frequency synchronization signal received from the second optical receiver 519.

Here, the transmission apparatus of FIG. 5A and the reception apparatus of FIG. 5B may operate as a single system. In this example, by separately transmitting the frequency synchronization signal and the management control signal using different wavelengths, qualities of the two signals may improve. In addition, a performance degradation (SNR degradation or intermodulation distortion) of an existing mobile communication signal may be prevented, and thus the overall system performance may improve in comparison to an in-band transmission system.

However, the system may increase construction costs and maintenance costs to additionally install a multiplexer/demultiplexer in the transmission apparatus of FIG. 5A and the reception apparatus of FIG. 5B to support FDM.

Figure 6A:
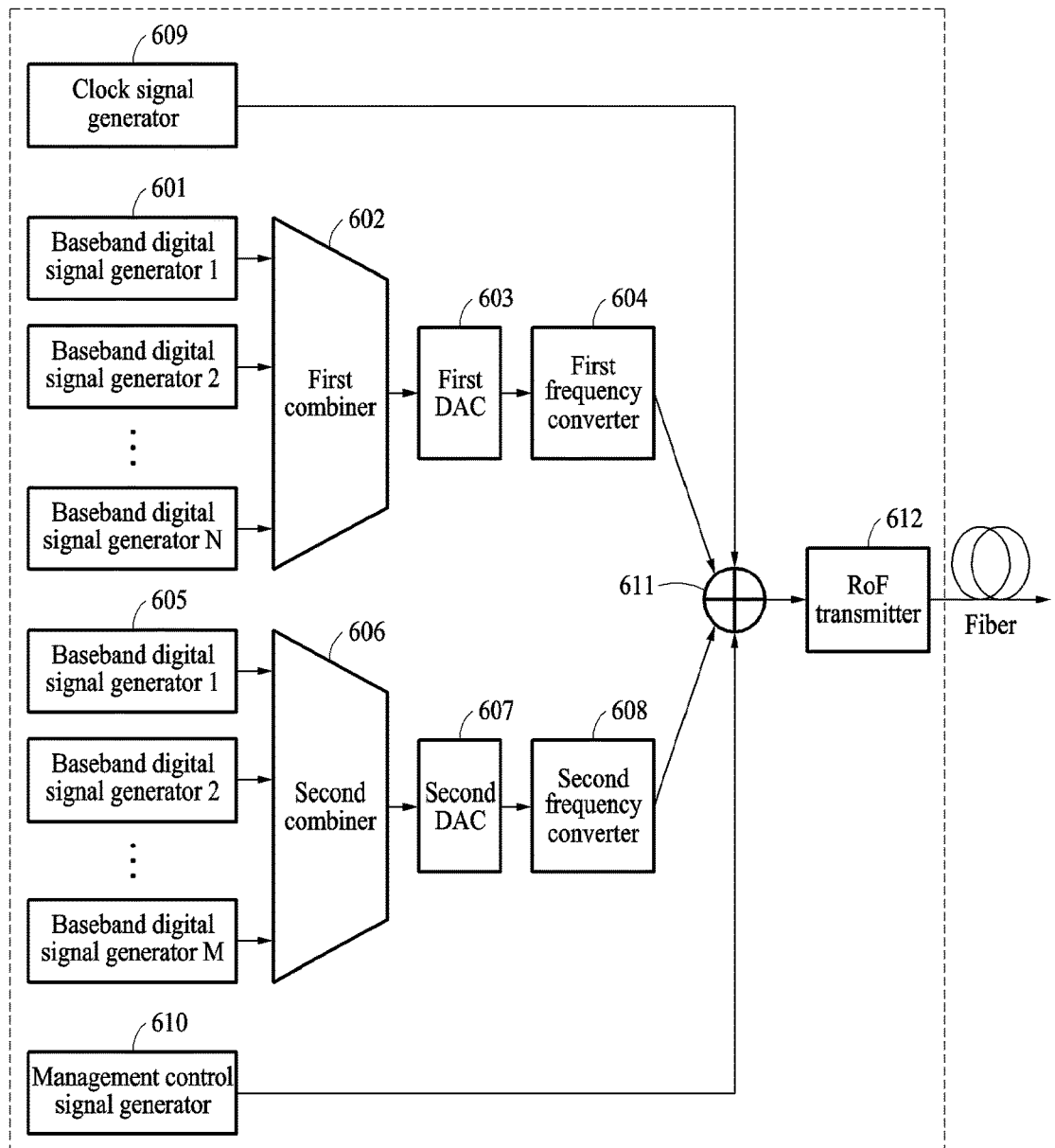
FIG. 6A is a diagram illustrating a transmission apparatus that transmits a frequency synchronization signal and a management control signal using in-band signaling in multiple bands according to an example embodiment.

FIG. 6A is a diagram illustrating a transmission apparatus that transmits a frequency synchronization signal and a management control signal using in-band signaling in multiple bands according to an example embodiment.

Referring to FIG. 6A, a transmission apparatus of a multi-band IFoF system has an in-band transmission structure to transmit a frequency synchronization signal and a management control signal together with mobile communication signals, that is, IF signals, in a form of IF. The transmission apparatus may include baseband digital signal generators 601, 605, a combiner 602, 606, a DAC 603, 607, a frequency converter 604, 608, an electrical combiner 611, an RoF transmitter 612, a clock signal generator 609, and a management control signal generator 610.

Here, a plurality of baseband digital signal generators 601 and 605, a plurality of combiners 602 and 606, a plurality of DACs 603 and 607, and a plurality of frequency converters 604 and 608 may be implemented. That is, unlike the single-band IFoF system of FIG. 2A, the multi-band IFoF system may include a plurality of antennas, and thus may transmit a greater number of data signals. The multi-band IFoF system may perform carrier aggregation with respect to the mobile communication signals, and transmit the mobile communication signals through multiple bands (like IF).

The baseband digital signal generators 601, 605 may each generate a single- or multi-channel baseband modulation signal using a data signal to be transmitted to a reception apparatus. The baseband digital signal generators 601, 605 may each express the data signal to be transmitted to the reception apparatus in a form suitable for suitable for short distance transmission or a form suitable for being loaded on a carrier using a digital signal. Further, the plurality of baseband digital signal generators 601 and 605 may each generate at least one digital baseband modulation signal, corresponding to a single channel or multiple channels, for mobile communication. In this example, the modulation signal may be generated in a form of a digital modulation signal.

In an example, the baseband digital signal generators 601 and 605 may each be implemented using a number of different frequency bands, and combined by different combiners 602 and 606.

A plurality of combiners 602 and 606 may be provided, and the combiners 602 and 606 may each combine a plurality of digital modulation signals generated by at least one of the baseband digital signal generators 601 and 605. In detail, the first combiner 602 may combine modulation signals generated by the baseband digital signal generators 601 including a baseband digital signal generator 1 through a baseband digital signal generator N. Further, the second combiner 606 may combine modulation signals generated by the baseband digital signal generators 605 including a baseband digital signal generator 1 through a baseband digital signal generator M.

A plurality of DACs 603 and 607 may be provided, and the DACs 603 and 607 may each convert the digital modulation signal combined by each corresponding combiner 602, 606 to an analog modulation signal. In detail, the first DAC 603 may convert the digital modulation signal combined by the first combiner 602 to an analog modulation signal. Further, the second DAC 607 may convert the digital modulation signal combined by the second combiner 606 to an analog modulation signal.

A plurality of frequency converters 604 and 608 may be provided, and the frequency converters 604 and 608 may each convert the analog modulation signal to an IF signal. In detail, the frequency converters 604 and 608 may each convert the analog modulation signal to the IF signal by combining the analog modulation signal with a carrier signal. That is, the frequency converters 604 and 608 may each incorporate the analog modulation signal in the IF signal by loading the modulation signal on the IF signal of a predetermined frequency.

In detail, the first frequency converter 604 may convert the analog modulation signal converted by the first DAC 603 by combining the analog modulation signal with a carrier signal. Further, the second frequency converter 608 may convert the analog modulation signal converted by the second DAC 607 by combining the analog modulation signal with a carrier signal.

The clock signal generator 609 may generate a frequency synchronization signal to be used to convert the analog modulation signal to the IF signal.

The management control signal generator 610 may generate a management control signal to manage a state of the reception apparatus.

The electrical combiner 611 may combine at least one of the IF signals, the frequency synchronization signal, and the management control signal into a transmission signal. That is, the electrical combiner 611 may multiplex the IF signals, the frequency synchronization signal, and the management control signal in a form of IF.

The RoF transmitter 612 may convert the transmission signal to an optical signal, and transmit the transmission signal in a form of the optical signal to the reception apparatus using in-band signaling.

Hence, the transmission apparatus may perform carrier aggregation with respect to the mobile communication signals, and transmit the mobile communication signals through multiple bands (like IF).

Figure 6B:
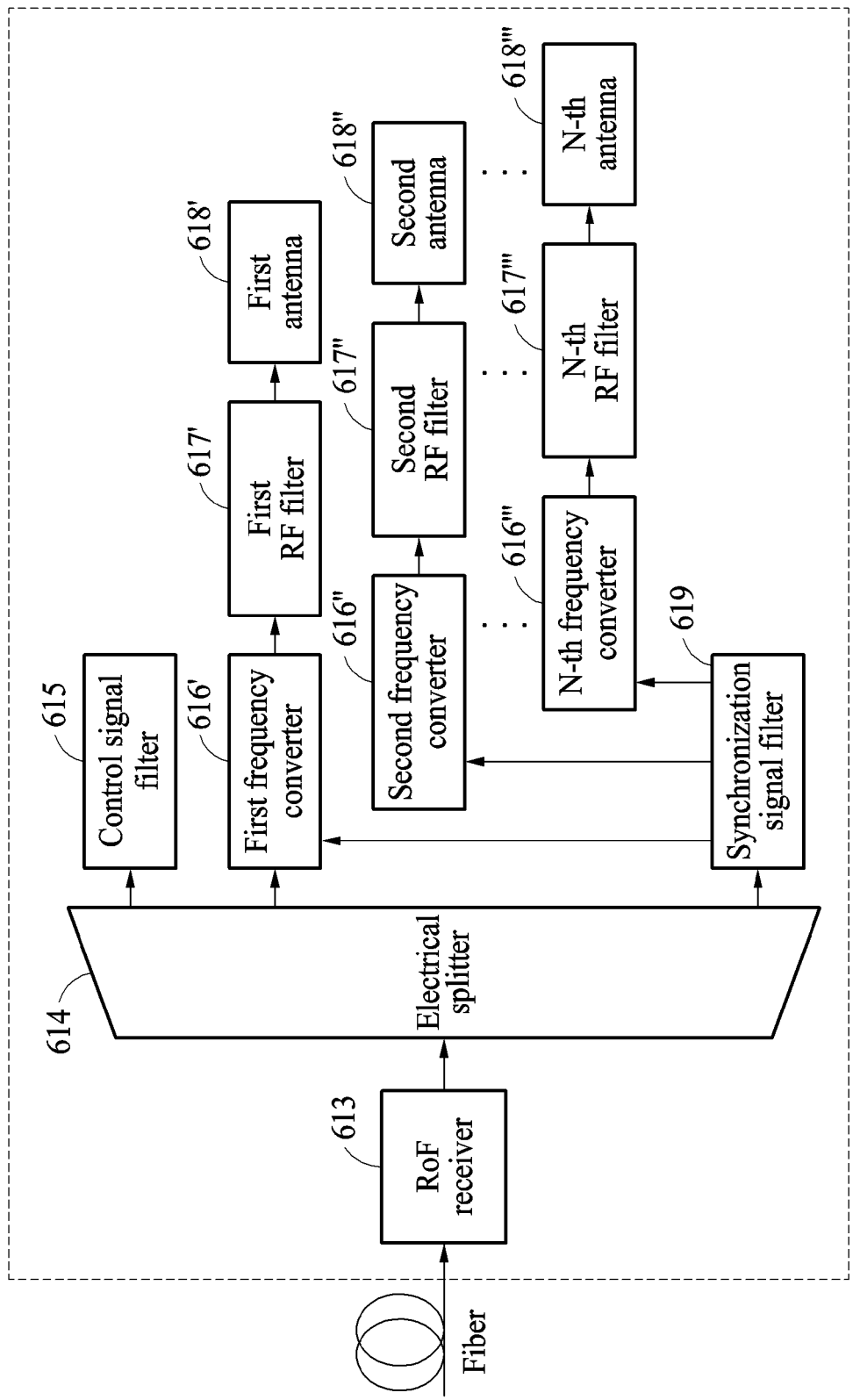
FIG. 6B is a diagram illustrating a reception apparatus that receives a frequency synchronization signal and a management control signal using in-band signaling in multiple bands according to an example embodiment.

FIG. 6B is a diagram illustrating a reception apparatus that receives a frequency synchronization signal and a management control signal using in-band signaling in multiple bands according to an example embodiment.

Referring to FIG. 6B, a reception apparatus of a multi-band IFoF system has an in-band transmission structure to receive a frequency synchronization signal and a management control signal together with mobile communication signals, that is, IF signals, in form of IF.

The reception apparatus may include an RoF receiver 613, an electrical splitter 614, a frequency converter 616', 616'', 616''', a synchronization signal filter 619, a control signal filter 615, an RF filter 617', 617'', 617''', and an antenna 618', 618'', 618'''.

The RoF receiver 613 may receive the transmission signal transmitted from the transmission apparatus of FIG. 6A. The RoF receiver 613 may convert the transmission signal from an optical signal to an electrical signal.

The electrical splitter 614 may split the transmission signal into at least one of IF signals, a frequency synchronization signal, and a management control signal. In this example, the IF signals may include a plurality of signals having different bands.

The synchronization signal filter 619 may filter the frequency synchronization signal split from the transmission signal by the electrical splitter 614.

The control signal filter 615 may filter the management control signal split from the transmission signal by the electrical splitter 614.

A plurality of frequency converters 616', 616'' through 616''' may be provided. That is, the multi-band IFoF system may include a plurality of antennas, and thus may receive mobile communication signals from the transmission apparatus through corresponding antennas. The frequency converters 616', 616'' through 616''' may be implemented to correspond to the mobile communication signals, respectively.

The frequency converters 616', 616'' through 616''' may each convert the corresponding IF signal split from the transmission signal by the electrical splitter 614 to an RF signal. In this example, the frequency converters 616', 616'' through 616''' may each convert the corresponding IF signal to the RF signal using the frequency synchronization signal filtered by the synchronization signal filter 619.

Similar to the frequency converters 616', 616'' through 616''', a plurality of RF filters 617', 617'' through 617''' may be provided. The RF filters 617', 617'' through 617''' may each filter the corresponding RF signal in view of a predetermined frequency band or a preset band. A plurality of antennas 618', 618'' through 618''' may be provided. The antennas 618', 618'' through 618''' may each transmit the corresponding filtered RF signal to a mobile. In this example, the RF signal may correspond to a mobile signal.

Here, the transmission apparatus of FIG. 6A and the reception apparatus of FIG. 6B may operate as a single system. In this example, all of the IF signals, the frequency synchronization signal, and the management control signal may be loaded on a single wavelength for transmission, and thus the system may have a cost-optimized structure.

Figure 7A:
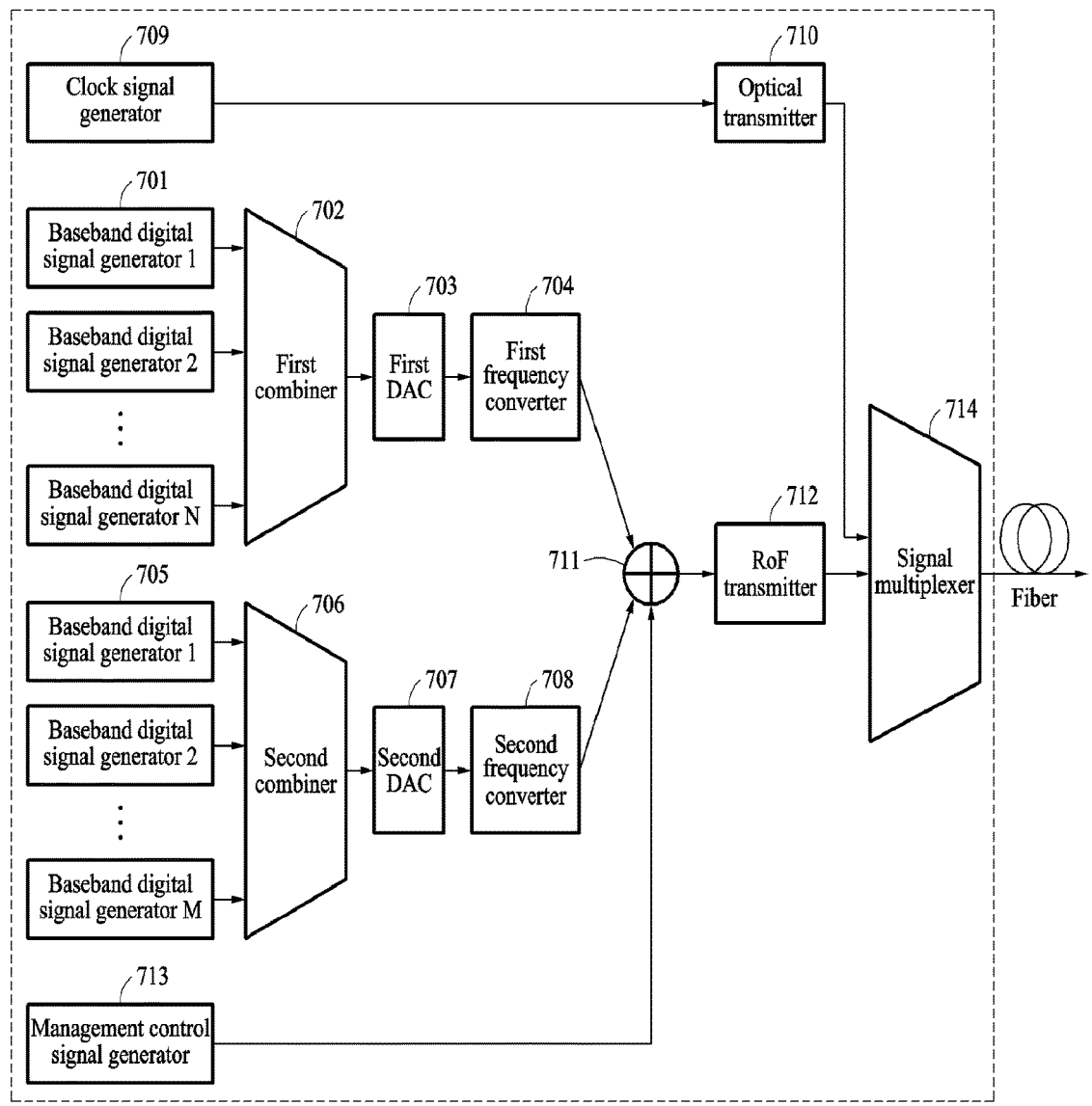
FIG. 7A is a diagram illustrating a transmission apparatus that transmits a frequency synchronization signal and a management control signal using in-band signaling and WDM in multiple bands according to an example embodiment.

FIG. 7A is a diagram illustrating a transmission apparatus that transmits a frequency synchronization signal and a management control signal using in-band signaling and WDM in multiple bands according to an example embodiment.

Referring to FIG. 7A, a transmission apparatus of a multi-band IFoF system has a structure to transmit IF signals and a management control signal using in-band signaling, and transmit a frequency synchronization signal using WDM. In detail, a performance degradation may occur at an IF-to-RF converter of a reception apparatus based on a quality of the frequency synchronization signal received from the transmission apparatus. Thus, the frequency synchronization signal may be transmitted to the reception apparatus by being loaded on a separate wavelength.

The transmission apparatus may include baseband digital signal generators 701, 705, a combiner 702, 706, a DAC 703, 707, a frequency converter 704, 708, an electrical combiner 711, an RoF transmitter 712, a clock signal generator 709, and a management control signal generator 713. The transmission apparatus may further include an optical transmitter 710 and a signal multiplexer 714 to transmit a frequency synchronization signal to the reception apparatus using WDM.

The baseband digital signal generators 701, 705, the combiner 702, 706, the DAC 703, 707, the frequency converter 704, 708, and the management control signal generator 713 of the transmission apparatus of FIG. 7A may perform the same operations described in the example of FIG. 6A, and thus duplicate description will be omitted herein. Elements differing from those described in the example of FIG. 6A will be described additionally.

The clock signal generator 709 may generate a frequency synchronization signal to be used to convert an analog modulation signal to an IF signal, and transmit the generated frequency synchronization signal to the optical transmitter 710. Here, to prevent a degradation of the frequency synchronization signal, the frequency synchronization signal may be transmitted to the optical transmitter 710 which is present separately from the RoF transmitter 712. The optical transmitter 710 may transmit the frequency synchronization signal to the signal multiplexer 714.

The electrical combiner 711 may combine IF signals converted by the plurality of frequency converters 704 and 708 and the management control signal into a single transmission signal. That is, the electrical combiner 711 may combine the IF signals and the management control signal into a single signal to be transmitted using in-band signaling.

The RoF transmitter 712 may convert the transmission signal from an electrical signal to an optical signal, and transmit the transmission signal in a form of the optical signal to the reception apparatus through an optical link using in-band signaling.

The signal multiplexer 714 may multiplex the frequency synchronization signal received from the optical transmitter 710, and transmit the multiplexed frequency synchronization signal to the reception apparatus through the optical link.

Figure 7B:
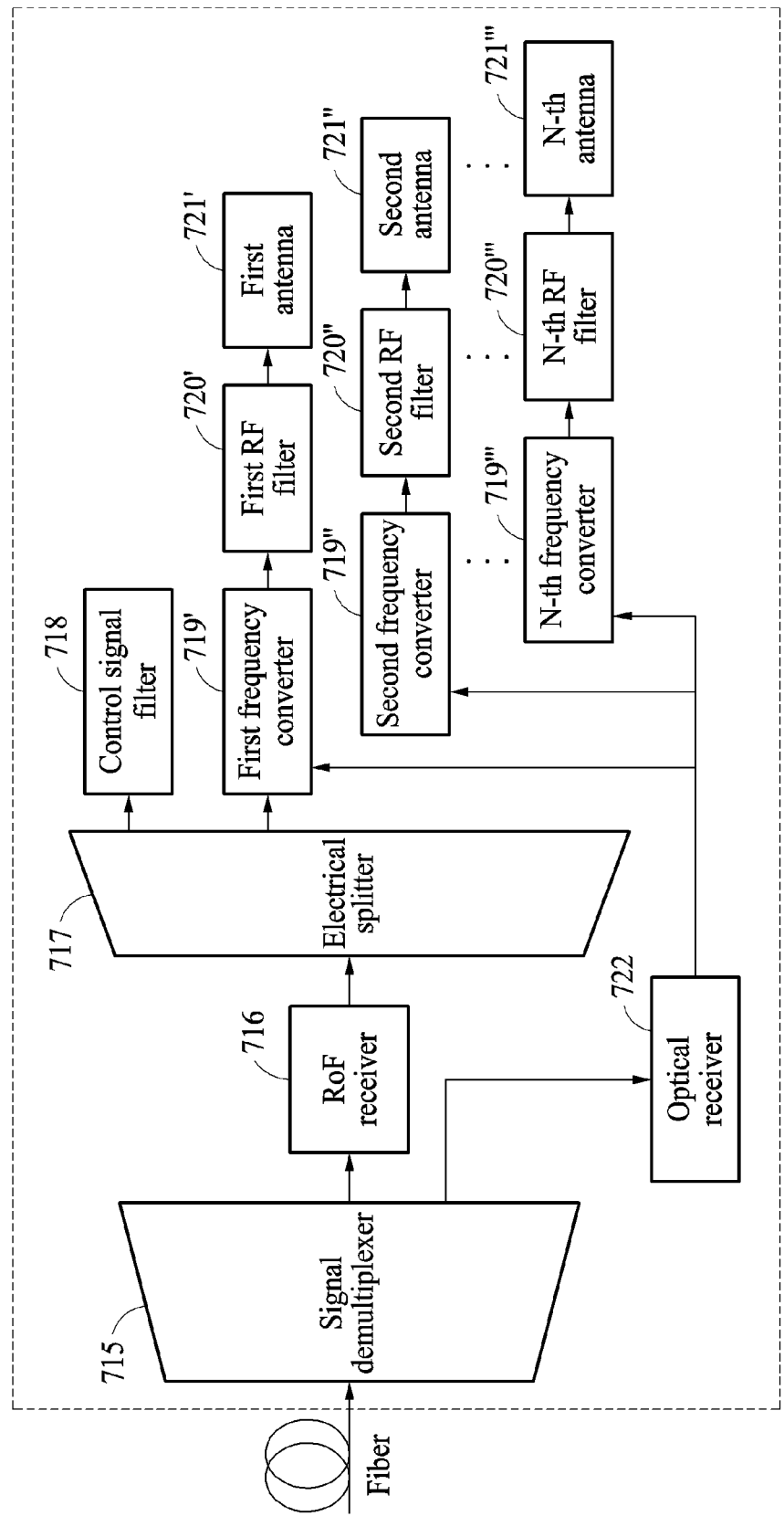
FIG. 7B is a diagram illustrating a reception apparatus that receives a frequency synchronization signal and a management control signal using in-band signaling and WDM in multiple bands according to an example embodiment.

FIG. 7B is a diagram illustrating a reception apparatus that receives a frequency synchronization signal and a management control signal using in-band signaling and WDM in multiple bands according to an example embodiment.

Referring to FIG. 7B, a reception apparatus of a single-band IFoF system has a structure to receive IF signals and a management control signal using in-band signaling, and receive a frequency synchronization signal using WDM.

The reception apparatus may include an RoF receiver 716, an electrical splitter 717, a frequency converter 719', 719", 719''', a control signal filter 718, an RF filter 720', 720", 720''', and an antenna 721', 721", 721'''. The reception apparatus may further include an optical receiver 722 and a signal demultiplexer 715 to receive a frequency synchronization signal.

The control signal filter 718, the RF filter 720', 720", 720''', and the antenna 721', 721", 721''' of the reception apparatus of FIG. 7B may perform the same operations described in the example of FIG. 6B, and thus duplicate description will be omitted herein. Elements differing from those described in the example of FIG. 6B will be described additionally.

The signal demultiplexer 715 may receive the frequency synchronization signal transmitted from the signal multiplexer 714 of the transmission apparatus of FIG. 7A, and transmit the frequency synchronization signal restored to the original independent signal to the optical receiver 722. That is, the signal demultiplexer 715 may restore original signals by dividing a multiplexed composite signal.

The RoF receiver 716 may receive the transmission signal from the transmission apparatus of FIG. 7A, and convert the received transmission signal from an optical signal to an electrical signal.

The electrical splitter 717 may split the transmission signal converted to the electrical signal by the RoF receiver 716 into IF signals and a management control signal. The electrical splitter 717 may transmit the IF signals and the management control signal to the frequency converters 719', 719" through 719''' and the control signal filter 718, respectively.

A plurality of frequency converters 719', 719" through 719''' may be provided, and the frequency converters 719', 719" through 719''' may correspond to the IF signals received from the electrical splitter 717, respectively. The frequency converters 719', 719" through 719''' may each receive the frequency synchronization signal from the optical receiver 722, and convert the corresponding IF signal to an RF signal using the received frequency synchronization signal.

Here, the transmission apparatus of FIG. 7A and the reception apparatus of FIG. 7B may operate as a single system. In this example, by separately transmitting the frequency synchronization signal using FDM, a quality of the frequency synchronization signal to be used by the reception apparatus to convert the IF signals to the RF signals may improve.

Figure 8A:
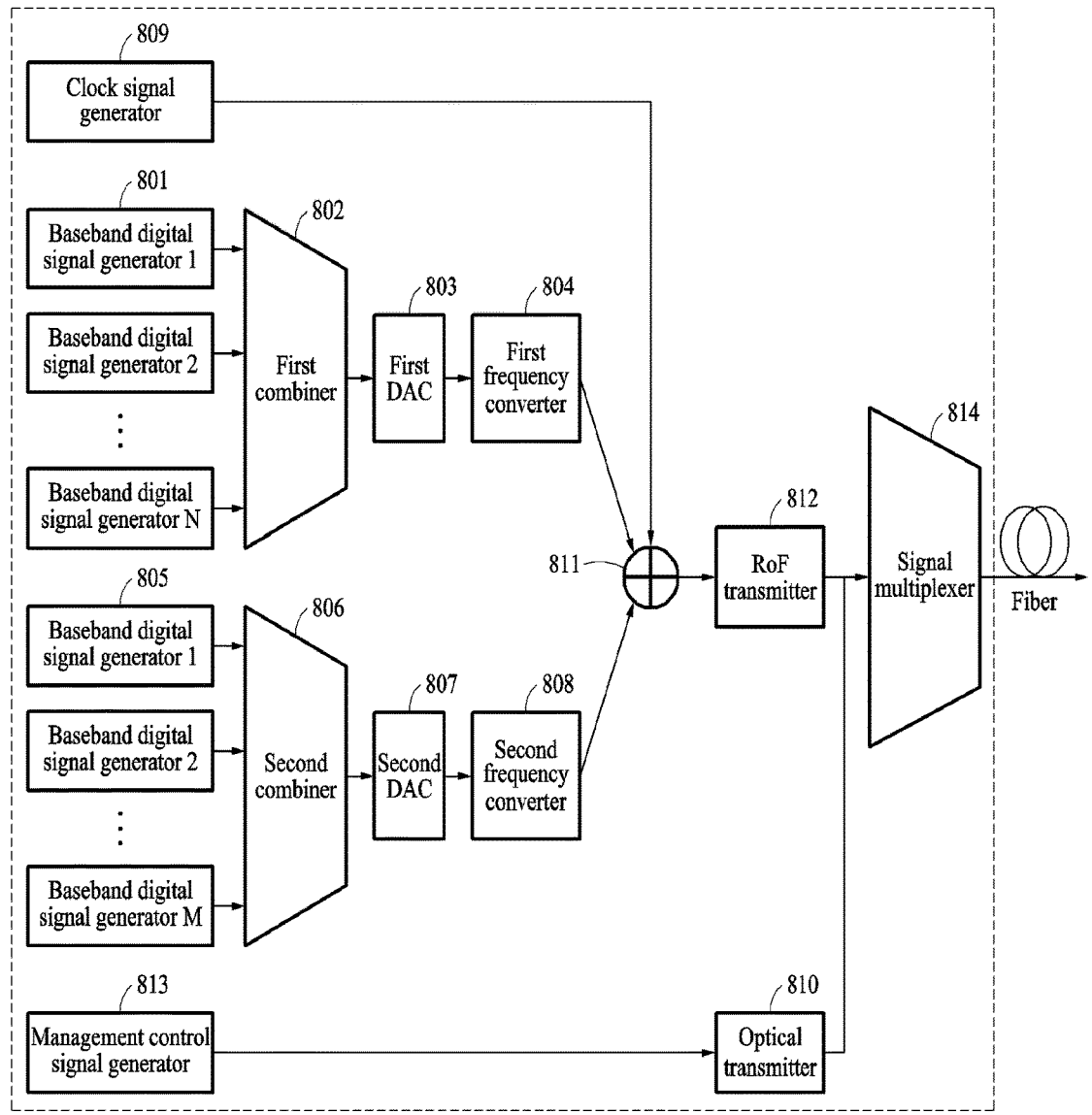
FIG. 8A is a diagram illustrating a transmission apparatus that transmits a frequency synchronization signal and a management control signal using in-band signaling and WDM in multiple bands according to another example embodiment.

FIG. 8A is a diagram illustrating a transmission apparatus that transmits a frequency synchronization signal and a management control signal using in-band signaling and WDM in multiple bands according to another example embodiment.

Referring to FIG. 8A, a transmission apparatus of a multi-band IFoF system has a structure to transmit IF signals and a frequency synchronization signal using in-band signaling, and transmit a management control signal using WDM.

The transmission apparatus may include baseband digital signal generators 801, 805, a combiner 802, 806, a DAC 803, 807, a frequency converter 804, 808, an electrical combiner 811, an RoF transmitter 812, a clock signal generator 809, and a management control signal generator 813. The transmission apparatus may further include an optical transmitter 810 and a signal multiplexer 814 to transmit a management control signal to a reception apparatus using WDM.

The baseband digital signal generators 801, 805, the combiner 802, 806, the DAC 803, 807, the frequency converter 804, 808, and the clock signal generator 809 of the transmission apparatus of FIG. 8A may perform the same operations described in the example of FIG. 6A, and thus duplicate description will be omitted herein. Elements differing from those described in the example of FIG. 6A will be described additionally.

The management control signal generator 813 may generate a management control signal to monitor and control a state of the reception apparatus and transmit the generated management control signal to the optical transmitter 810. Here, to improve a quality of the management control signal, the management control signal may be transmitted to the optical transmitter 810 which is present separately from the RoF transmitter 812. The optical transmitter 810 may transmit the management control signal to the signal multiplexer 814.

The electrical combiner 811 may combine IF signals and a frequency synchronization signal into a single transmission signal. That is, the electrical combiner 811 may combine the IF signals and the frequency synchronization signal into a single signal to be transmitted using in-band signaling.

The RoF transmitter 812 may convert the transmission signal from an electrical signal to an optical signal, and transmit the transmission signal in a form of the optical signal to the reception apparatus through an optical link using in-band signaling.

The signal multiplexer 814 may multiplex the management control signal received from the optical transmitter 810 using FDM, and transmit the multiplexed management control signal to the reception apparatus through the optical link.

Figure 8B:
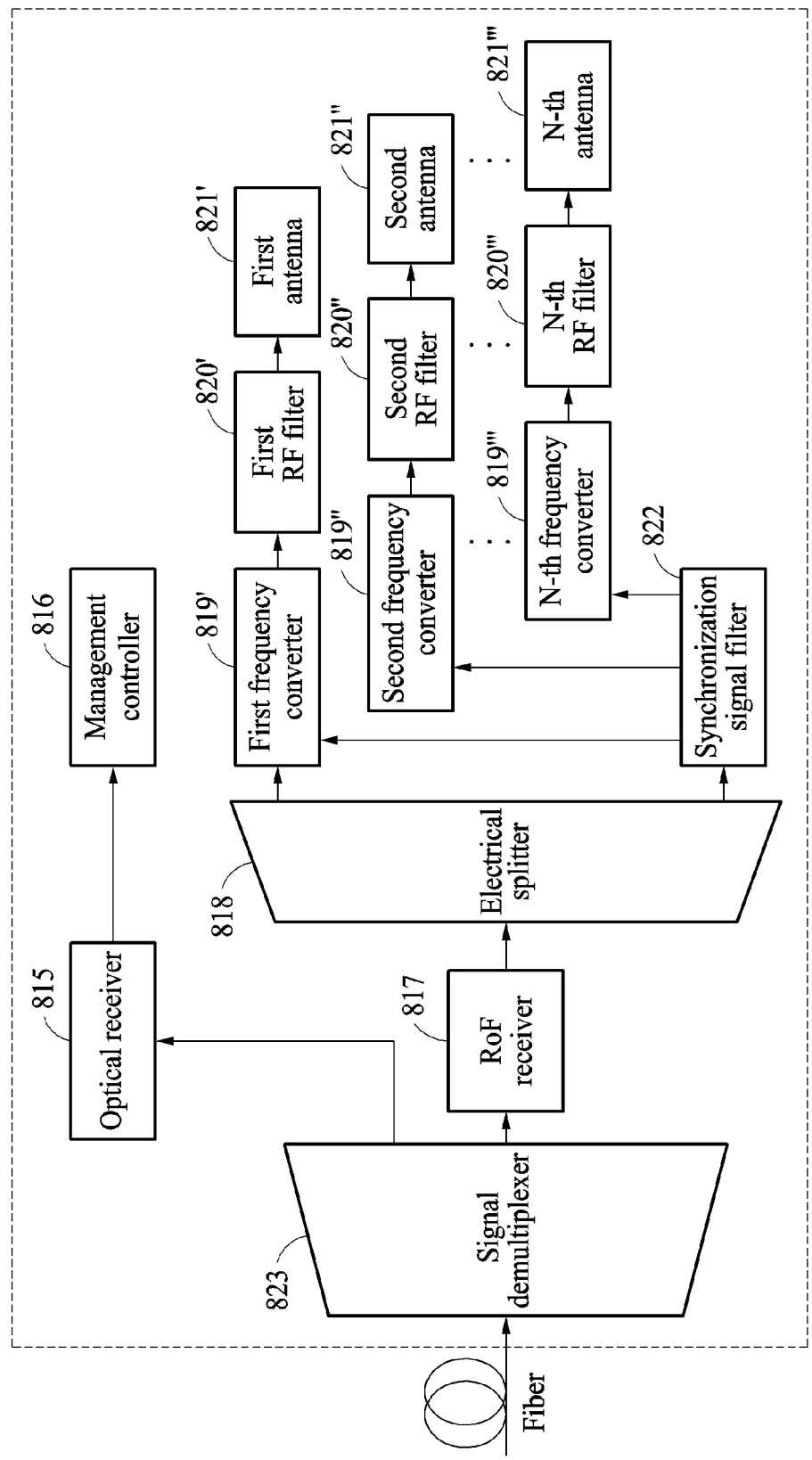
FIG. 8B is a diagram illustrating a reception apparatus that receives a frequency synchronization signal and a management control signal using in-band signaling and WDM in multiple bands according to another example embodiment.

FIG. 8B is a diagram illustrating a reception apparatus that receives a frequency synchronization signal and a management control signal using in-band signaling and WDM in multiple bands according to another example embodiment.

Referring to FIG. 8B, a reception apparatus of a multi-band IFoF system has a structure to receive IF signals and a frequency synchronization signal using in-band signaling, and receive a management control signal using WDM.

The reception apparatus may include an RoF receiver 817, an electrical splitter 818, a frequency converter 819', 819", 819''', a synchronization signal filter 822, an RF filter

820', 820", 820''', and an antenna 821', 821", 821'''. The reception apparatus may further include an optical receiver 815, a management controller 816, and a signal demultiplexer 823 to receive a management control signal.

The frequency converter 819', 819", 819''', the synchronization signal filter 822, the RF filter 820', 820", 820''', and the antenna 821', 821", 821''' of the reception apparatus of FIG. 8B may perform the same operations described in the example of FIG. 6B, and thus duplicate description will be omitted herein. Elements differing from those described in the example of FIG. 6B will be described additionally.

The signal demultiplexer 823 may receive the management control signal transmitted from the signal multiplexer 814 of the transmission apparatus of FIG. 8A. In this example, the management control signal is a signal multiplexed by the signal multiplexer 814. Thus, the signal demultiplexer 823 may restore the multiplexed management control signal to the original independent signal, and transmit the restored management control signal to the optical receiver 815.

The optical receiver 815 may transmit the management control signal received from the signal demultiplexer 823 to the management controller 816. The management controller 816 may monitor a state of the reception apparatus using the management control signal.

The RoF receiver 817 may receive the transmission signal from the transmission apparatus of FIG. 8A, and convert the received transmission signal from an optical signal to an electrical signal.

The electrical splitter 818 may split the transmission signal converted to the electrical signal by the RoF receiver 817 into IF signals and a frequency synchronization signal. The electrical splitter 818 may transmit the IF signals and the frequency synchronization signal to the frequency converters 819', 819" through 819''' and the synchronization signal filter 822, respectively.

Here, the transmission apparatus of FIG. 8A and the reception apparatus of FIG. 8B may operate as a single system. In this example, by separately transmitting the management control signal using FDM, a quality of the management control signal may improve in comparison to a case of being transmitted using in-band signaling.

Figure 9A:
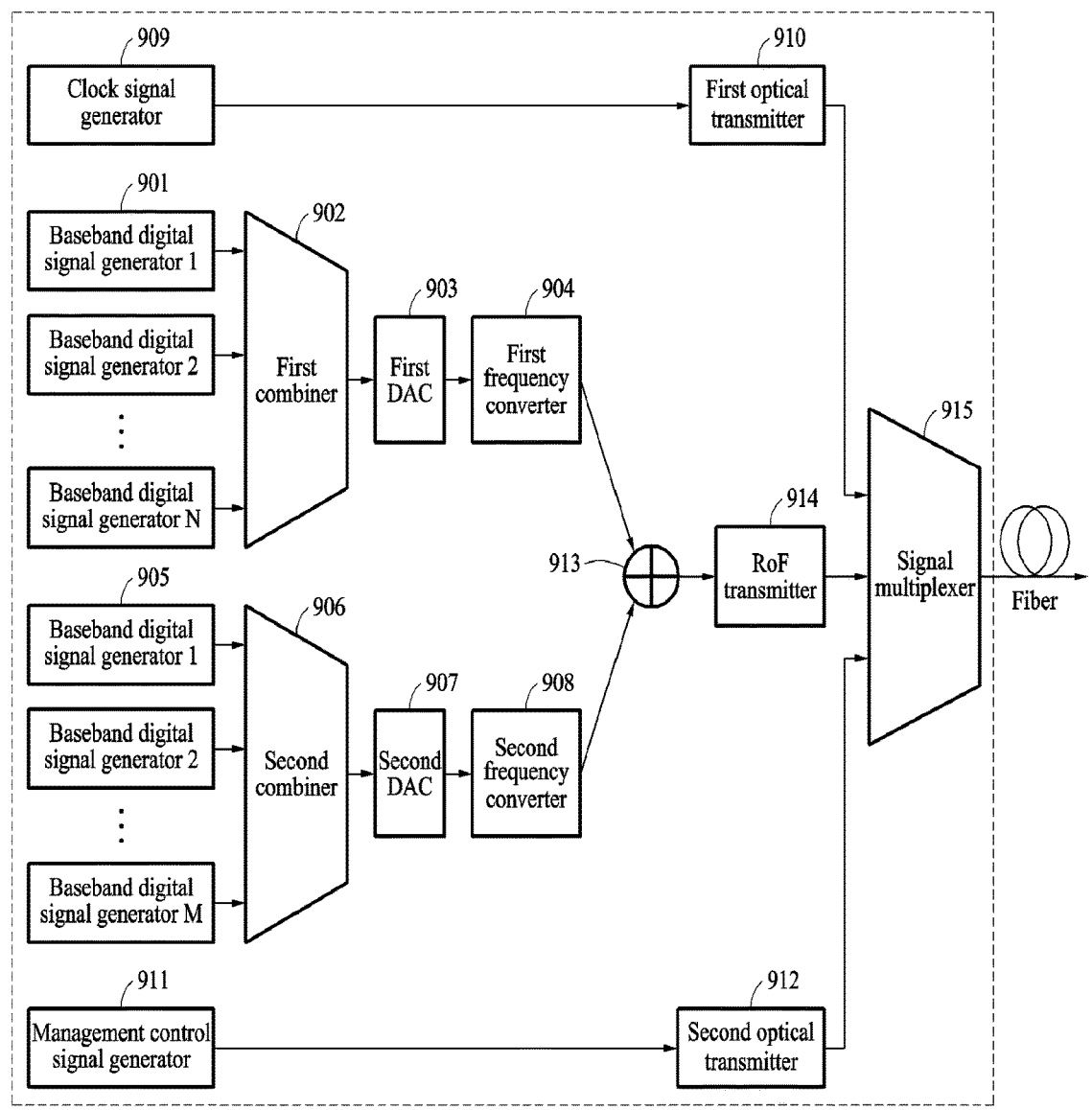
FIG. 9A is a diagram illustrating a transmission apparatus that transmits a frequency synchronization signal and a management control signal using WDM in multiple bands according to an example embodiment.

FIG. 9A is a diagram illustrating a transmission apparatus that transmits a frequency synchronization signal and a management control signal using WDM in multiple bands according to an example embodiment.

Referring to FIG. 9A, the transmission apparatus of a multi-band IFoF system has a structure to transmit IF signals, a frequency synchronization signal, and a management control signal using WDM.

The transmission apparatus may include baseband digital signal generators 901, 905, a combiner 902, 906, a DAC 903, 907, a frequency converter 904, 908, an electrical combiner 913, an RoF transmitter 914, a clock signal generator 909, and a management control signal generator 911. The transmission apparatus may further include a first optical transmitter 910, a second optical transmitter 912, and a signal multiplexer 915 to transmit the IF signals, the frequency synchronization signal, and the management control signal to a reception apparatus using WDM.

The baseband digital signal generators 901, 905, the combiner 902, 906, the DAC 903, 907, and the frequency converter 904, 908 of the transmission apparatus of FIG. 9A may perform the same operations described in the example of FIG. 6A, and thus duplicate description will be omitted herein. Elements differing from those described in the example of FIG. 6A will be described additionally.

The clock signal generator 909 may generate a frequency synchronization signal to be used to convert an analog modulation signal to an IF signal. The clock signal generator 909 may transmit the frequency synchronization signal to the first optical transmitter 910. The first optical transmitter 910 may transmit the frequency synchronization signal to the signal multiplexer 915.

The electrical combiner 913 may combine IF signals converted by the plurality of frequency converters 904 and 908. In detail, the electrical combiner 913 may combine the IF signals received from the first frequency converter 904 and the second frequency converter 908.

The RoF transmitter 914 may convert the IF signals converted by the frequency converter 904, 908 from an electrical signal to an optical signal. The RoF transmitter 914 may transmit the IF signals in a form of the optical signal to the signal multiplexer 915.

The management control signal generator 911 may generate a management control signal to manage a state of the reception apparatus. The management control signal generator 911 may transmit the management control signal to the second optical transmitter 912. The second optical transmitter 912 may transmit the management control signal to the signal multiplexer 915.

The signal multiplexer 915 may multiplex the IF signals, the frequency synchronization signal, and the management control signal using WDM. The signal multiplexer 915 may transmit the frequency synchronization signal and the management control signal to the reception apparatus using different wavelengths.

Figure 9B:
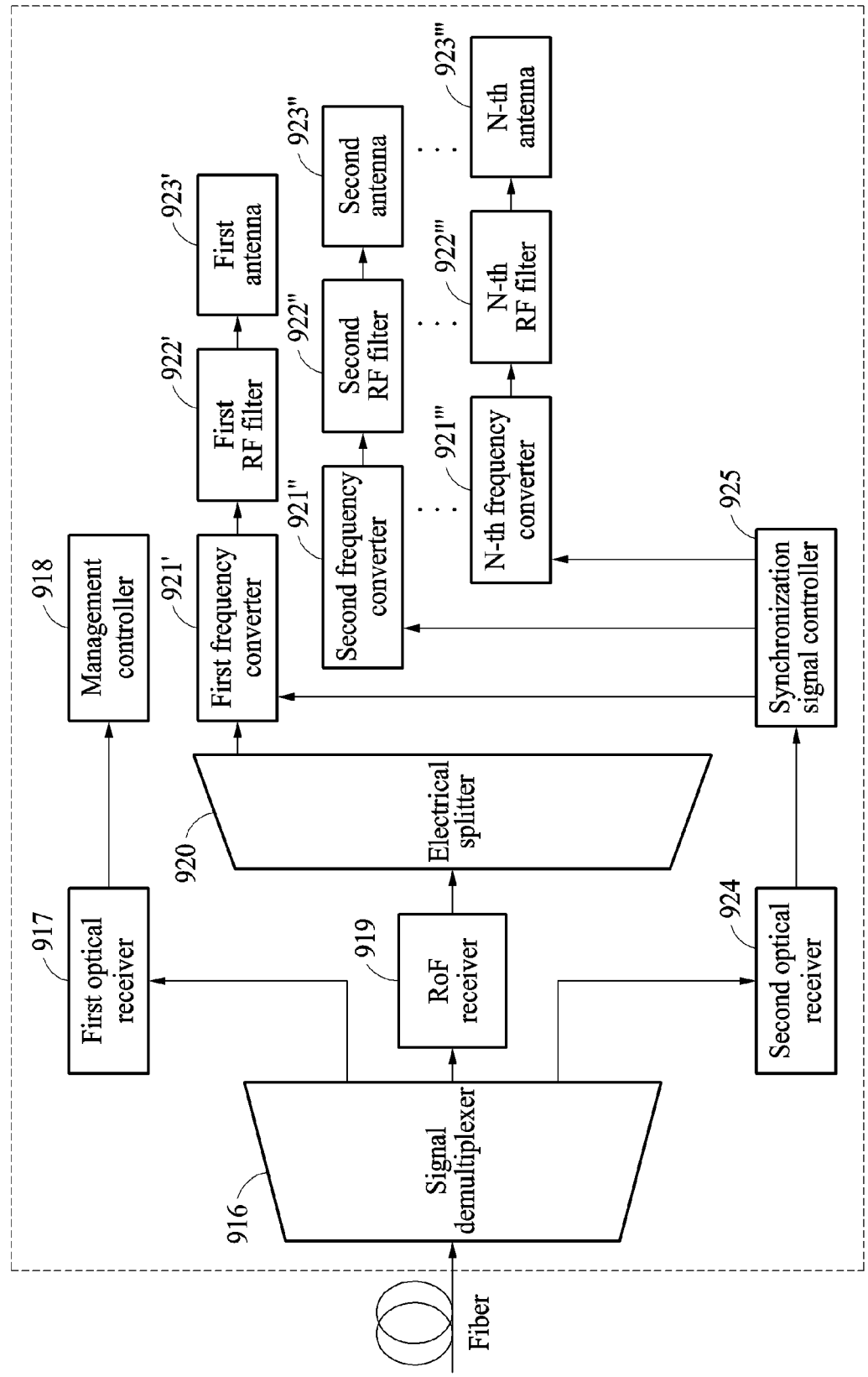
FIG. 9B is a diagram illustrating a reception apparatus that receives a frequency synchronization signal and a management control signal using WDM in multiple bands according to an example embodiment.

FIG. 9B is a diagram illustrating a reception apparatus that receives a frequency synchronization signal and a management control signal using WDM in multiple bands according to an example embodiment.

Referring to FIG. 9B, a reception apparatus of a multi-band IFoF system has a structure to receive IF signals, a frequency synchronization signal, and a management control signal using WDM.

The reception apparatus may include an RoF receiver 919, an electrical splitter 920, a frequency converter 921', 921", 921''', an RF filter 922', 922", 922''', and an antenna 923', 923", 923'''. The reception apparatus may further include a first optical receiver 917, a management controller 918, a second optical receiver 924, a synchronization signal controller 925, and a signal demultiplexer 916 to receive the IF signals, the frequency synchronization signal, and the management control signal transmitted using WDM.

The RF filter 922', 922", 922''' and the antenna 923', 923", 923''' of the reception apparatus of FIG. 9B may perform the same operations described in the example of FIG. 6B, and thus duplicate description will be omitted herein. Elements differing from those described in the example of FIG. 6B will be described additionally.

The signal demultiplexer 916 may receive the IF signals, the frequency synchronization signal, and the management control signal using WDM. The signal demultiplexer 916 may restore signals corresponding to the IF signals, the frequency synchronization signal, and the management control signal, respectively. The signal demultiplexer 916 may transmit the management control signal to the first optical receiver 917, transmit the IF signals to the RoF receiver 919, and transmit the frequency synchronization signal to the second optical receiver 924.

The first optical receiver 917 may receive the management control signal from the signal demultiplexer 916, and transmit the received management control signal to the management controller 918. The management controller 918 may monitor and control a state of the reception apparatus using the received management control signal.

The second optical receiver 924 may receive the frequency synchronization signal from the signal demultiplexer 916, and transmit the received frequency synchronization signal to the synchronization signal controller 925. The synchronization signal controller 925 may transmit the frequency synchronization signal to each of the frequency converters 921', 921" through 921'''.

The RoF receiver 919 may receive the IF signals from the signal demultiplexer 916, convert the IF signals from an optical signal to an electrical signal, and transmit the IF signals in a form of the optical signal to the electrical splitter 920. The electrical splitter 920 may split the IF signals received from the RoF receiver 919 to the frequency converters 921', 921" through 921''', respectively.

The frequency converters 921', 921" through 921''' may each convert the corresponding IF signal to an RF signal using the frequency synchronization signal received from the synchronization signal controller 925.

Here, the transmission apparatus of FIG. 9A and the reception apparatus of FIG. 9B may operate as a single system. By transmitting the frequency synchronization signal and the management control signal using different wavelengths, a transmission performance may improve in comparison to a structure in which the frequency synchronization signal and the management control signal are transmitted together with mobile communication signals. However, additional costs may increase.

According to an example embodiment, a transmission apparatus and a reception apparatus may provide a structure to transmit and receive a frequency synchronization signal and a management control signal in a mobile fronthaul using an IFoF based analog transmission scheme for efficient construction and operation of a next generation mobile communication base station for a mobile network operator.

The components described in the example embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the example embodiments of the present invention may be achieved by software, and the software may be recorded on a recording medium. The components, the functions, and the processes described in the example embodiments of the present invention may be achieved by a combination of hardware and software.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A transmission apparatus comprising:
at least one processor;
a memory having instructions stored thereon, which, when executed by the at least one processor, cause the at least one processor to function as:
a baseband digital signal generator configured to generate a single- or multichannel baseband digital modulation signal using a data signal to be transmitted to a reception apparatus;

a combiner configured to combine the single- or multi-channel baseband digital modulation signal;

a digital-to-analog converter (DAC) configured to convert the digital modulation signal to an analog modulation signal;

a frequency converter configured to convert the analog modulation signal to an intermediate frequency (IF) signal;

a clock signal generator configured to generate a frequency synchronization signal which is used to convert the analog modulation signal to the IF signal;

a management control signal generator configured to generate a management control signal to manage a state of the reception apparatus; and a radio-over-fiber (RoF) transmitter configured to convert a transmission signal to an optical signal and transmit the transmission signal in a form of the optical signal to the reception apparatus.

2. The transmission apparatus of claim 1, further comprising:

an electrical combiner configured to combine at least one of the IF signal, the frequency synchronization signal, and the management control signal into a transmission signal, wherein the transmission signal is generated by combining the IF signal, the frequency synchronization signal and the management control signal through the electrical combiner.

3. The transmission apparatus of claim 1, further comprising:

an optical transmitter configured to receive the frequency synchronization signal;

an electrical combiner configured to combine at least one of the IF signal, the frequency synchronization signal, and the management control signal into a transmission signal; and a signal multiplexer configured to multiplex the frequency synchronization signal and the transmission signal, and transmit the multiplexed frequency synchronization signal and the multiplexed transmission signal to the reception apparatus, wherein the transmission signal is generated by combining the IF signal and the management control signal through the electrical combiner.

4. The transmission apparatus of claim 1, further comprising:

an optical transmitter configured to receive the management control signal;

an electrical combiner configured to combine at least one of the IF signal, the frequency synchronization signal, and the management control signal into a transmission signal; and a signal multiplexer configured to multiplex the management control signal and the transmission signal, and transmit the multiplexed management control signal and the multiplexed transmission signal to the reception apparatus, wherein the transmission signal is generated by combining the IF signal and the frequency synchronization signal through the electrical combiner.

5. The transmission apparatus of claim 1, further comprising:

a first optical transmitter configured to receive the frequency synchronization signal;

a second optical transmitter configured to receive the management control signal; and a signal multiplexer, wherein the RoF transmitter is configured to transmit the transmission signal in a form of the optical signal to the signal multiplexer, and wherein the signal multiplexer is configured to multiplex the frequency synchronization signal, the management control signal and the transmission signal, and transmit the multiplexed frequency synchronization signal, the multiplexed management control signal and the multiplexed transmission signal to the reception apparatus.

6. A reception apparatus comprising:

at least one processor;

a memory having instructions stored thereon, which, when executed by the at least one processor, cause the at least one processor to function as:

a radio-over-fiber (RoF) receiver configured to receive a transmission signal transmitted from a transmission apparatus;

an electrical splitter configured to split the transmission signal into at least one of an intermediate frequency (IF) signal, a frequency synchronization signal, and a management control signal;

a synchronization signal filter configured to filter the frequency synchronization signal;

a frequency converter configured to convert the IF signal to a radio frequency (RF) signal using the filtered frequency synchronization signal;

a control signal filter configured to filter the management control signal;

an RF filter configured to filter the RF signal; and an antenna configured to output the filtered RF signal.

7. The reception apparatus of claim 6, wherein:

the transmission signal comprises:

the IF signal and the management control signal transmitted using in-band signaling; and the frequency synchronization signal transmitted using wavelength division multiplexing (WDM), and the reception apparatus further comprises:

a signal demultiplexer configured to divide the transmission signal in view of a scheme of transmitting the transmission signal;

an optical receiver configured to receive the frequency synchronization signal divided from the transmission signal; and a control signal filter configured to filter the management control signal, wherein the RoF receiver is configured to receive the IF signal and the management control signal divided from the transmission signal, and wherein the frequency converter is configured to convert the IF signal to the RF signal using the frequency synchronization signal.

8. The reception apparatus of claim 6, wherein:

the transmission signal comprises:

the IF signal and the frequency synchronization signal transmitted using in-band signaling; and the management control signal transmitted using WDM, and the reception apparatus further comprises:

a signal demultiplexer configured to divide the transmission signal in view of a scheme of transmitting the transmission signal;

an optical receiver configured to receive the management control signal divided from the transmission signal;

a management controller configured to manage a state of the reception apparatus using the management control signal; and a synchronization signal filter configured to filter the frequency synchronization signal, wherein the RoF receiver is configured to receive the IF signal and the frequency synchronization signal divided from the transmission signal, and wherein the frequency converter is configured to convert the IF signal to the RF signal using the frequency synchronization signal.

9. The reception apparatus of claim 6, further comprising:

a signal demultiplexer configured to divide the transmission signal into the IF signal, the frequency synchronization signal, and the management control signal transmitted using wavelength division multiplexing (WDM);

a first optical receiver configured to receive the management control signal divided from the transmission signal;

a management controller configured to manage a state of the reception apparatus using the management control signal; and a second optical receiver configured to receive the frequency synchronization signal divided from the transmission signal, wherein the RoF receiver is configured to receive the IF signal divided from the transmission signal, and wherein the frequency converter is configured to convert the IF signal to the RF signal using the frequency synchronization signal.

10. A transmission apparatus comprising:

at least one processor;

a memory having instructions stored thereon, which, when executed by the at least one processor, cause the at least one processor to function as:

a baseband digital signal generator configured to generate a single- or multichannel baseband digital modulation signal using a data signal to be transmitted to a reception apparatus;

combiners each configured to combine the single- or multi-channel baseband digital modulation signal;

digital-to-analog converters (DACs) each configured to convert the digital modulation signal to an analog modulation signal, the DACs respectively corresponding to the combiners;

frequency converters each configured to convert the analog modulation signal to an intermediate frequency (IF) signal, the frequency converters respectively corresponding to the DACs;

a clock signal generator configured to generate a frequency synchronization signal which is used to convert the analog modulation signal to the IF signal;

a management control signal generator configured to generate a management control signal to manage a state of the reception apparatus; and a radio-over-fiber (RoF) transmitter configured to convert a transmission signal to an optical signal and transmit the transmission signal in a form of the optical signal to the reception apparatus.

11. The transmission apparatus of claim 10, further comprising:

an electrical combiner configured to combine at least one of the IF signal, the frequency synchronization signal, and the management control signal into a transmission signal, wherein the transmission signal is generated by combining the IF signal, the frequency synchronization signal, and the management control signal through the electrical combiner.

12. The transmission apparatus of claim 10, further comprising:

an optical transmitter configured to receive the frequency synchronization signal;

an electrical combiner configured to combine at least one of the IF signal, the frequency synchronization signal, and the management control signal into a transmission signal; and a signal multiplexer configured to multiplex the frequency synchronization signal and the transmission signal, and transmit the multiplexed frequency synchronization signal and the multiplexed transmission signal to the reception apparatus, wherein the transmission signal is generated by combining the IF signal and the management control signal through the electrical combiner.

13. The transmission apparatus of claim 10, further comprising:

an optical transmitter configured to receive the management control signal;

an electrical combiner configured to combine at least one of the IF signal, the frequency synchronization signal, and the management control signal into a transmission signal; and a signal multiplexer configured to multiplex the management control signal and the transmission signal, and transmit the multiplexed management control signal and the multiplexed transmission signal to the reception apparatus, wherein the transmission signal is generated by combining the IF signal and the frequency synchronization signal through the electrical combiner.

14. The transmission apparatus of claim 10, further comprising:

a first optical transmitter configured to receive the frequency synchronization signal;

a second optical transmitter configured to receive the management control signal; and a signal multiplexer, wherein the RoF transmitter is configured to transmit the transmission signal in a form of the optical signal to the signal multiplexer, and wherein the signal multiplexer is configured to multiplex the frequency synchronization signal, the management control signal, and the transmission signal, and transmit the multiplexed frequency synchronization signal, the multiplexed management control signal and the multiplexed transmission signal to the reception apparatus.

* * * * *